US010789558B2

(12) United States Patent
Waldeck et al.

(10) Patent No.: US 10,789,558 B2
(45) Date of Patent: Sep. 29, 2020

(54) NON-LINEAR SYSTEMS AND METHODS FOR DESTINATION SELECTION

(71) Applicant: ASTRAZENECA PHARMACEUTICALS LP, Wilmington, DE (US)

(72) Inventors: Christopher Waldeck, Wilmington, DE (US); Daniel Stavish, Rockville, MD (US)

(73) Assignee: AstraZeneca Pharmaceuticals LP, Wilmington, DE (US)

( * ) Notice: Subject to any disclaimer, the term of this patent is extended or adjusted under 35 U.S.C. 154(b) by 42 days.

(21) Appl. No.: 15/988,208

(22) Filed: May 24, 2018

(65) Prior Publication Data

US 2018/0349412 A1    Dec. 6, 2018

Related U.S. Application Data

(60) Provisional application No. 62/513,042, filed on May 31, 2017.

(51) Int. Cl.
*G06Q 10/06* (2012.01)
*G06Q 10/04* (2012.01)
(Continued)

(52) U.S. Cl.
CPC ..... *G06Q 10/06311* (2013.01); *G06F 16/285* (2019.01); *G06F 16/29* (2019.01);
(Continued)

(58) Field of Classification Search
CPC ... G01C 21/3438; G06F 16/285; G06F 16/29; G06Q 10/02; G06Q 10/025; G06Q 10/04;
(Continued)

(56) References Cited

U.S. PATENT DOCUMENTS 5,948,040 A     9/1999  DeLorme et al.
6,324,517 B1 *  11/2001 Bingham ............... G06Q 10/02
                                                  705/7.24
(Continued)

FOREIGN PATENT DOCUMENTS

WO    WO-2016/061951 A1 *  4/2016

OTHER PUBLICATIONS

App No. PCT/US2018/034331 International Search Report, dated Aug. 29, 2018.
(Continued)

*Primary Examiner* — Faris S Almatrahi
*Assistant Examiner* — David A Testardi
(74) *Attorney, Agent, or Firm* — Weiss & Arons LLP

(57) ABSTRACT

Apparatus and methods for machine-based planning. The apparatus may cluster a plurality of geographically different resources into a plurality of clusters of proximate resources. The apparatus may calculate a cost of transporting each resource to each of a plurality of destinations. The apparatus may map each cluster to one of the destinations to determine a sum of costs of transporting all of the resources to the destinations. The apparatus may assign to each of the plurality of destinations only resources: that are mapped to the destination; for which the destination has sufficient capacity to accommodate the resources; and whose assignment to the destination does not exclude from the destination, by filling the capacity, a different resource that is: mapped to the destination; and has a net cost that is higher than a net cost of the resource of the assignment.

32 Claims, 30 Drawing Sheets

(51) Int. Cl.
*G06F 16/29* (2019.01)
*G06F 16/28* (2019.01)
*G06Q 10/10* (2012.01)

(52) U.S. Cl.
CPC ....... *G06Q 10/04* (2013.01); *G06Q 10/06314* (2013.01); *G06Q 10/06315* (2013.01); *G06Q 10/1095* (2013.01)

(58) Field of Classification Search
CPC ............... G06Q 10/047; G06Q 10/06; G06Q 10/06311; G06Q 10/06314; G06Q 10/06315; G06Q 10/1095; G06Q 10/0631; G06Q 10/06313
See application file for complete search history.

(56) References Cited

U.S. PATENT DOCUMENTS

| | | | |
|---|---|---|---|
| 6,865,538 B2* | 3/2005 | Chithambaram | G06Q 50/01 705/1.1 |
| 7,027,995 B2* | 4/2006 | Kaufman | G06Q 10/109 705/7.12 |
| 7,343,312 B2* | 3/2008 | Capek | G06Q 10/109 705/7.19 |
| 7,707,256 B2* | 4/2010 | Rollin | G06Q 10/02 709/206 |
| 7,881,233 B2* | 2/2011 | Bieselin | H04L 12/1845 370/260 |
| 8,121,853 B2 | 2/2012 | Cates | |
| 8,121,953 B1 | 2/2012 | Orttung et al. | |
| 9,558,457 B2* | 1/2017 | V | G06Q 10/02 |
| 9,569,745 B1* | 2/2017 | Ananthanarayanan | G06Q 10/083 |
| 10,228,257 B2* | 3/2019 | Baer | G01C 21/3438 |
| 2002/0065689 A1* | 5/2002 | Bingham | G06Q 10/02 705/5 |
| 2002/0069094 A1 | 6/2002 | Bingham et al. | |
| 2002/0184063 A1* | 12/2002 | Kaufman | G06Q 10/0631 705/7.12 |
| 2003/0204474 A1* | 10/2003 | Capek | G06Q 10/109 705/64 |
| 2004/0039579 A1* | 2/2004 | Chithambaram | G06Q 10/109 705/319 |
| 2005/0114194 A1* | 5/2005 | Pandit | G06Q 10/047 705/7.26 |
| 2006/0004613 A1* | 1/2006 | Roller | G06Q 10/025 705/6 |
| 2006/0045030 A1* | 3/2006 | Bieselin | H04L 12/1818 370/260 |
| 2006/0206363 A1 | 9/2006 | Gove | |
| 2007/0008905 A1* | 1/2007 | Berger | H04L 29/06 370/254 |
| 2007/0118415 A1* | 5/2007 | Chen | G06Q 10/02 705/5 |
| 2007/0282661 A1* | 12/2007 | Franco | G06Q 10/06311 705/7.19 |
| 2008/0114840 A1* | 5/2008 | Rollin | G06Q 10/02 709/206 |
| 2009/0055238 A1* | 2/2009 | Baryshnikov | G06Q 10/06 705/7.19 |
| 2009/0327227 A1* | 12/2009 | Chakra | G06Q 10/10 |
| 2010/0030569 A1 | 2/2010 | Okano et al. | |
| 2010/0106627 A1* | 4/2010 | O'Sullivan | G06Q 10/06375 705/30 |
| 2011/0035327 A1* | 2/2011 | Benda | G06Q 10/04 705/336 |
| 2011/0066468 A1* | 3/2011 | Huang | G01C 21/3438 705/7.19 |
| 2011/0106573 A1* | 5/2011 | McNamara | G06Q 10/1095 705/5 |
| 2011/0213583 A1* | 9/2011 | Mao | G01S 5/0252 702/150 |
| 2012/0136571 A1* | 5/2012 | Simon | G06Q 10/06 701/465 |
| 2012/0209512 A1* | 8/2012 | Kujirai | G01C 21/3423 701/428 |
| 2013/0031013 A1* | 1/2013 | V | G06Q 10/02 705/319 |
| 2013/0117062 A1* | 5/2013 | Rangarajan | G06Q 10/06 705/7.25 |
| 2013/0117454 A1* | 5/2013 | Rangarajan | G06F 9/5011 709/226 |
| 2014/0025418 A1* | 1/2014 | Huang | G06Q 10/063112 705/7.23 |
| 2014/0180957 A1* | 6/2014 | Arunapuram | G06Q 10/08355 705/338 |
| 2014/0278061 A1 | 9/2014 | Michael | |
| 2015/0073688 A1* | 3/2015 | Hampapur | G08G 1/0145 701/118 |
| 2017/0248432 A1* | 8/2017 | Kilby | G06Q 10/04 |
| 2017/0336219 A1* | 11/2017 | Di Lorenzo | G06Q 10/047 |
| 2018/0113881 A1* | 4/2018 | Kecskemeti | G06F 16/287 |
| 2018/0135993 A1* | 5/2018 | Thangaraj | G01C 21/3438 |
| 2018/0149484 A1* | 5/2018 | Baer | G01C 21/3438 |
| 2018/0188049 A1* | 7/2018 | Shi | G01C 21/343 |

OTHER PUBLICATIONS

App No. PCT/US2018/034331 Written Opinion of the International Searching Authority, dated Aug. 29, 2018.

* cited by examiner

Venue 2

| Traveler Index | Traveler Preference Rank | Traveler Shadow Value |
|---|---|---|
| 44 | 1 | 418.81 |
| 51 | 1 | 351.96 |
| 38 | 1 | 165.13 |
| 18 | 1 | 48.97 |
| 40 | 1 | 2.77 |
| 7 | 2 | 780.86 |
| 51 | 2 | 715.45 |
| 77 | 2 | 697.19 |
| 78 | 2 | 636.44 |
| 58 | 2 | 595.63 |
| 100 | 2 | 450.39 |
| 2 | 2 | 386.00 |
| 13 | 2 | 373.02 |
| 57 | 2 | 234.12 |
| 83 | 2 | 192.71 |
| 79 | 2 | 150.55 |
| 86 | 2 | 119.43 |
| 75 | 2 | 10.50 |

Venue 2 Capacity Constraint

Venue 2

| Traveler Index | Traveler Preference Rank | Traveler Shadow Value |
|---|---|---|
| 44 | 1 | 418.81 |
| 51 | 1 | 351.96 |
| 38 | 1 | 165.13 |
| 18 | 1 | 48.97 |
| 40 | 1 | 2.77 |
| 77 | 2 | 697.19 |
| 13 | 2 | 373.02 |

EVO: Event Optimization | Event Solution Summary | Solution Details

Show [10 ▼] entries      Search: [ ]

| | Destination ⬍ | City ⬍ | Province ⬍ | Country ⬍ | HotelStar Rating ⬍ | Guest Rooms ⬍ | Theater Capacity ⬍ | Classroom Capacity ⬍ | Meeting Rooms ⬍ | Meeting Space SqFt ⬍ | Total Attendees ⬍ | Overall Driving Cost ⬍ |
|---|---|---|---|---|---|---|---|---|---|---|---|---|
| 1 | Hotel A | Lansing | MI | USA | 3.5 | 256 | 800 | 600 | 12 | 10000 | 500 | $19,416.00 |
| 2 | Hotel B | Vienna | VA | USA | 3.5 | 449 | 1720 | 890 | Unlisted | Unlisted | 500 | $26,901.00 |
| 3 | Hotel C | Biloxi | MS | USA | 4 | 706 | 1135 | 627 | 14 | Unlisted | 500 | $19,664.00 |
| 4 | Hotel D | New York | NY | USA | 2.5 | 1705 | 1000 | 500 | 10 | Unlisted | 500 | $24,292.00 |
| 5 | Hotel E | Jackson | MS | USA | 3 | 117 | 1400 | 600 | Unlisted | Unlisted | 500 | $17,211.00 |
| 6 | Hotel F | Chicago | IL | USA | 3.5 | 470 | 1000 | 600 | 24 | 27500 | 500 | $15,955.00 |
| 7 | Hotel G | Columbus | OH | USA | 4 | 532 | 1200 | 700 | 15 | 30000 | 500 | $19,791.00 |
| 8 | Hotel H | Chicago | IL | USA | 4 | 1198 | 2200 | 1220 | 54 | Unlisted | 500 | $19,511.00 |
| 9 | Hotel I | Branson | MO | USA | 3.5 | 294 | 2475 | 920 | 5 | Unlisted | 500 | $36,984.00 |
| 10 | Hotel J | Dallas | TX | USA | 4.5 | 1001 | 3700 | 2210 | 39 | 110000 | 500 | $16,666.00 |

Showing 1 to 10 of 15 entries      Previous [1] 2 Next

Please Note: Estimates do not include Production Costs

EVO: Event Optimization | Event | Solution Summary | Solution Details

Show [10 ▼] entries           Search: [　　　]

| | Destination ⇔ | City ⇔ | Province ⇔ | Country ⇔ | HotelStar Rating ⇔ | Theater Capacity ⇔ | Classroom Capacity ⇔ | Guest Rooms ⇔ | NightlyAccommodation Rate ⇔ | Comparison Cost ⇔ | CompCostPerPerson PerEventDay ⇔ |
|---|---|---|---|---|---|---|---|---|---|---|---|
| 1 | Hotel A | Lansing | MI | USA | 3.5 | 800 | 600 | 256 | $177.00 | $937,021.00 | $375.00 |
| 2 | Hotel B | Vienna | VA | USA | 3.5 | 1720 | 890 | 449 | $183.00 | $967,203.00 | $387.00 |
| 3 | Hotel C | Biloxi | MS | USA | 4 | 1135 | 627 | 706 | $149.00 | $968,530.00 | $387.00 |
| 4 | Hotel D | New York | NY | USA | 2.5 | 1000 | 500 | 1705 | $135.00 | $1,099,712.00 | $440.00 |
| 5 | Hotel E | Jackson | MS | USA | 3 | 1400 | 600 | 117 | $123.00 | $1,135,931.00 | $454.00 |
| 6 | Hotel F | Chicago | IL | USA | 3.5 | 1000 | 600 | 470 | $215.00 | $1,173,333.00 | $469.00 |
| 7 | Hotel G | Columbus | OH | USA | 4 | 1200 | 700 | 532 | $218.00 | $1,213,772.00 | $486.00 |
| 8 | Hotel H | Chicago | IL | USA | 4 | 2200 | 1220 | 1198 | $185.00 | $1,300,280.00 | $520.00 |
| 9 | Hotel I | Branson | MO | USA | 3.5 | 2475 | 920 | 294 | $238.00 | $1,306,323.00 | $523.00 |
| 10 | Hotel J | Dallas | TX | USA | 4.5 | 3700 | 2210 | 1001 | $299.00 | $1,346,562.00 | $539.00 |

Showing 1 to 10 of 15 entries          Previous [1] 2 Next

Please Note: Estimates do not include Production Costs

FIG. 30

NON-LINEAR SYSTEMS AND METHODS FOR DESTINATION SELECTION

CROSS-REFERENCE TO RELATED APPLICATIONS

This is a nonprovisional application of U.S. Patent Application No. 62/513,042, filed May 31, 2017, which is hereby incorporated herein in its entirety.

BACKGROUND

Event planning is largely dependent on event destination and accommodation availability and cost as well as logistics costs. Tactical resource allocation tools can provide potential event destination options based on destination, accommodation, and travel costs that are available at a given time by identifying relevant offers that exist in the marketplace. These tools can provide available options for having an event at a set time and date. Such tools could, for example, associate event attendees with local airline offers around the time of the event and calculate costs for attendees to attend the event at a specific destination. However, these tools are heavily constrained by availability and momentary temporal factors, such as holidays, that do not reflect the potential optimal event costs. High flight cost variability, in particular, pushes results from these systems further from the optimal solution that would be reached by shedding the constraints imposed by the planning horizon given to an event organizer. Planning without knowledge of the optimal solution as it compares to a solution available in a given moment blinds individuals and organization from the costs created by their planning practices.

One tactical resource allocation tool is disclosed in U.S. Pat. No. 8,121,953 B1 ("Orttung"). Orttung describes a meeting planning tool that allows a user to optimize the overall cost of the meeting to the lowest point in a total-cost-of-ownership approach to planning.

Orrtung, however, describes scheduling a meeting based on availability. For example, the meeting tool of Orrtung can scan invited attendees' schedules, determine if they can be present or not based on flight schedules and other dependencies, and determine possible times and places for a meeting. Such a system does not allow a user to determine the overall optimal destination for a meeting, but rather allows a user to determine a meeting time and place subject to attendee and destination availability.

Another resource allocation tool is disclosed in US Publication No. 2002/0069094 A1 ("Bingham"). Bingham discusses a system and method for reserving meeting facility resources. Bingham specifically determines whether meeting facility resources are available for reservation. However, the optimal meeting resources might not be available for the requested reservation date. A user of the system described in Bingham would therefore be unaware of whether the reserved meeting facility resources were the optimal selection.

Accordingly, there is a need in the art for systems and methods that allow event planners to determine an optimal event destination selection, regardless of availability. The results thereof would enable event managers to quantify the costs limited planning windows and set benchmarks to improve processes. Moreover, the instances of existing art that incorporate the number of sites to be utilized accept it as a parameter, while the systems and methods described herein optimizes both the partitioning of travelers and the selection of destinations using a novel optimization algorithm.

BRIEF DESCRIPTION OF DRAWINGS

The objects and advantages of the invention will be apparent upon consideration of the following detailed description, taken in conjunction with the accompanying drawings, in which like reference characters refer to like parts throughout, and in which:

FIG. 15 shows illustrative information in accordance with principles of the invention;

FIG. 24 shows illustrative information in accordance with principles of the invention;

FIG. 26 shows illustrative information in accordance with principles of the invention;

FIG. 29 shows illustrative information in accordance with principles of the invention;

FIG. 30 shows illustrative information in accordance with principles of the invention;

DETAILED DESCRIPTION

Figure 1:
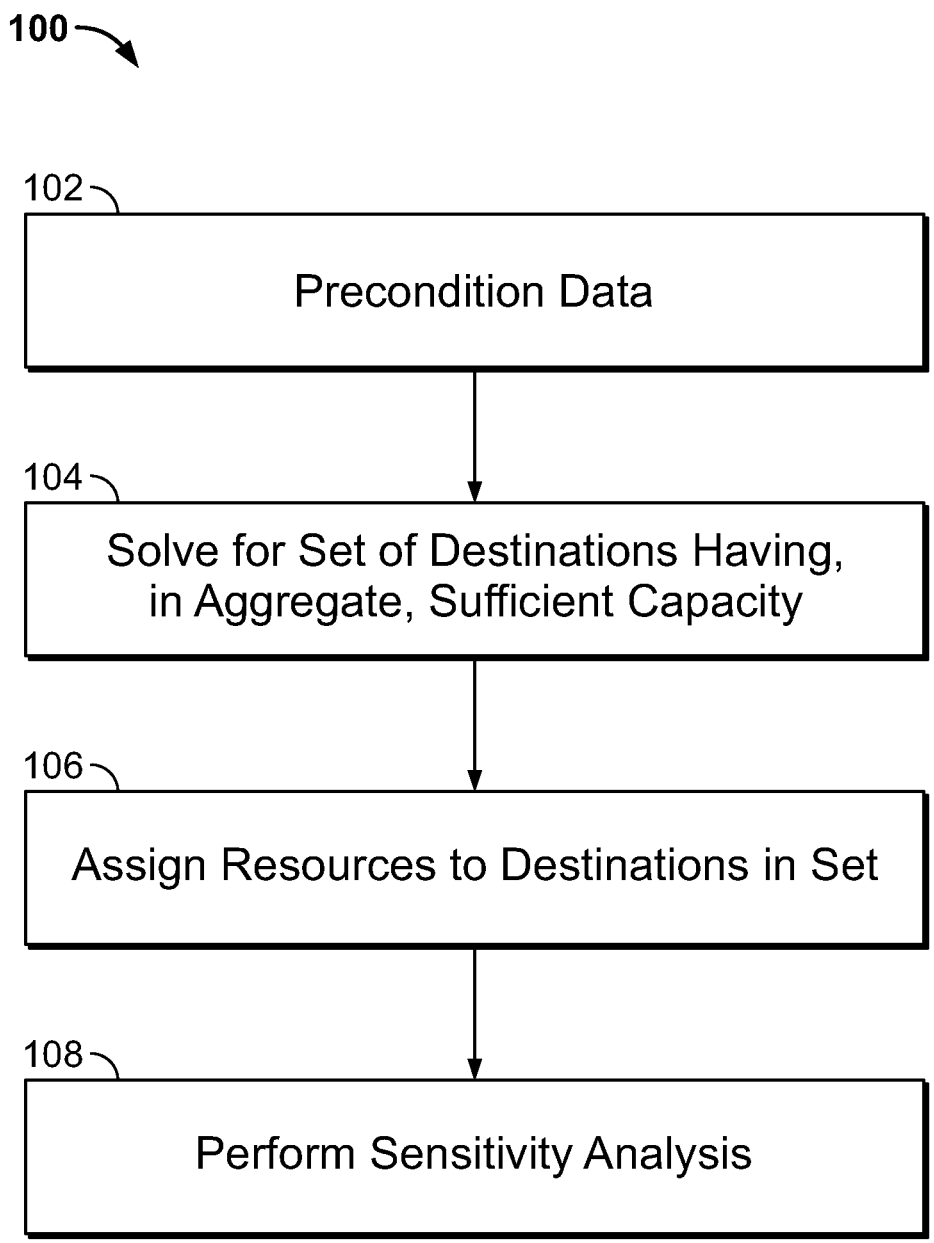
FIG. 1 shows illustrative process steps in accordance with principles of the invention.

To provide an overall understanding of the systems and methods described herein, certain illustrative embodiments will now be described, including systems and methods for optimizing destination selection using logistics models in tandem with live and historical destination pricing. To this end, in certain embodiments, market constraints that exist during an actual event planning process may be removed, thereby allowing a best (as determined by the total cost of attendance/number of attendees) way to hold an event to be determined. Market constraints may include, for example, destination availability and flight availability. The systems and methods described herein may be useful, for example, in determining how well a past event was planned, the best possible way to hold a future event (regardless of when exactly that event is to be held), and to set standards for optimal pricing for future unplanned events. However, it will be understood by one of ordinary skill in the art that the systems and methods described herein may be adapted and modified for other suitable applications and that such other additions and modifications will not depart from the scope hereof.

In the following discussion of illustrative embodiments, the terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "based on," as used in the claims and specification herein, is not exclusive and allows for being based on additional factors that may or may not be described.

The systems and methods described herein may include an event simulator that may provide an optimal event planning solution, including an optimal destination. An optimal event planning solution may be chosen as that with the lowest fully-loaded cost. The cost of an event may include accommodation for event attendees, destination, food and beverages, air travel, and conference management, for example. The systems and methods described herein base cost on, for example, long-term seasonal trends, live data, and historical data. Historical data may specifically be used to simulate travel to possible destinations. In some embodiments, the systems and methods described herein do not rely on third party data. In these embodiments, data relevant to determining the optimal event planning solution is stored within the systems described herein, such as the databases shown in FIG. 20. As additional event data is gathered over time and subsequently stored as historical data, the systems and methods described herein may provide even more accurate results, while other technologies' solutions for a given event are subject to the supplier base that is available to the respective platforms.

Furthermore, the systems and methods described herein provide a budgeting and cost estimation tool for event planning. The systems and methods described herein may be availability agnostic, meaning the best set of solutions for event planning is presented to a user, regardless of whether the associated event options are available for a date or time. Therefore, the systems and methods described herein may provide theoretical event planning solutions, thereby providing a broader solution space than previous methods. Such systems and methods may be useful not only for planning events, but also for judging the performance of people who are planning or who have planned events, because the systems and methods descried herein may guarantee the solution provided is a complete feasible solution for the event.

Event planning, as used herein, may include optimal destination selection. The optimal destination selection may be based on, for example, attendee location, cost of travel for attendees, and destination cost. An optimal destination may satisfy all input criteria at the lowest fully-loaded coast. Attendees of the event may include employees, field salesforce, and other related individuals. Attendee groups may be added to the overall solution via a user interface. In some embodiments, the systems and methods described herein may provide salesforce selection refinement. The salesforce selection refinement may be applied via region, role, or other salesforce selection criteria.

The optimal destination solutions are determined partially through a logistics model that may be based on, for example, geographic attendee dispersion, live event pricing, and historical event pricing. Event pricing may include event-specific costs may include, for example, food, destination space rental, related technology, support staff. Geography-based calculations are performed utilizing the locations of critical infrastructure such as airports and simulating travel by car.

The optimal destination selection may be a selection that satisfies destination selection criteria. The destination selection criteria may, for example, include use of meeting space, number of guest rooms, and the number of people attending the event. In some embodiments, the destination selection systems and methods utilize a unique meeting space table with the event space in both "Classroom" and "Theater" seating styles.

The systems and methods described herein may determine the optimal number of destinations to utilize for an event. In at least one embodiment, a user may specify how many destinations they would like to use for an event and the systems and methods described herein return the best solutions possible based on this user specification. In another embodiment, the solutions with the optimal number of destinations are returned, regardless of the user's selection regarding the number of destinations. In another embodiment, the user is notified of the optimal number of destinations to utilize for an event. In embodiments wherein the group of travelers is split to go to multiple locations, a custom optimization algorithm partitions the group to ensure the set of destinations in the result achieve the lowest possible cost while respecting the constraints of each destination (e.g. not sending 400 guests to a destination that may only accommodate 300). If a destination's constraints are broken by the initial solution, some travelers are assigned to another destination based on the cost of sending the group elsewhere. In embodiments where a sensitivity analysis is displayed, this process is run repeatedly, dropping the destination with the highest "shadow cost" (the destination whose exclusion from the set of possible destinations adds the most cost to the solution). This algorithm is distinct from common MCNFP solution algorithms because it exploits preconditions of the single-destination optimization that is performed on spatially-optimized subgroups. By utilizing characteristics of potentially suboptimal initial solutions, the traditional need to calculate the cost of every possible subset of travelers going to every possible destination is eliminated while guaranteeing an optimal outcome within the set of destinations that exist in the data given to the application at the time of execution.

A user interface, such as an event planning portal, is provided for easy user accessibility. At the user interface, users may, for example, enter event parameters, choose salesforce and destination selection criteria, view system results, and download results.

The determination of the optimal destination solution depends on processing a large amount of data that may be accessed from third-party or proprietary databases. Such database access may occur by using any known query language to access the database, such as structured query language (SQL). As used herein, structured query language SQL is a domain-specific language used in computer programming and designed for managing data held in relational database management systems or for stream processing in a relational data stream management system.

The distance of attendees from possible event destinations may be used to determine, for example, travel time and associated expenses. The systems and methods described herein use geographic calculations to route people from business hubs and homes to simulate travel costs. Prior to optimization run time, a multitude of travel arcs, including each travel arc's associated direct and indirect cost, are calculated from non-Euclidean distance calculations between points of interest. Points of interest may include, for example, attendee homes, airports, attendee businesses, and potential event destinations. The results of these calculations are partially cached in an associated system prior to optimization run time. This simulation may be through a network similar to that in a minimum cost network flow problem (MCNFP) network. The systems and methods described herein may also account for which attendees should be driving to destinations (if they are close enough) and incorporate this information into the provided solution.

In at least one embodiment, the optimal grouping of attendees is determined. For example, some attendees might live or work near one another. These attendees could be grouped together for travel, such as transportation to a nearby airport and flying to the event on the same flight. This kind of grouping may reduce travel costs. For multiple destination solutions, optimal grouping may be configured to best utilize the multiple event destinations. For example, optimal grouping may be based on attendee interests or roles. Attendees sharing similar interests may be grouped together and assigned to a destination of the multiple destinations. The solution may include a "drive vs. fly" decision for each attendee traveling to the event. The drive vs. fly decision determines whether, for each attendee, driving or flying to the event would be more cost effective. This decision may be a factor of the optimal grouping.

Optimal destination solutions are presented with sensitivities. The sensitivities break down exactly which cost advantages and disadvantages led to the ultimate solution for each destination and, if applicable, each group of travelers. The systems and methods described herein may provide outcome sensitivity visualization. "Halos" around optimal location indicate how much better one option is than another by using scaled differences in prices as halo circumferences.

The systems and methods described herein deliver logistics costs associated with the optimal solution. A logistics cost may include salary information for each attendee based on the respective attendee travel time. The logistics cost may include lost salary and work time for each attendee. The systems and methods described herein may, for example, extracts internal (e.g. salary) costs from external costs in order to provide a benchmark rate for event planners while negotiating with potential vendors.

The apparatus may include, and the methods may involve, a system for machine-based planning. The system may include means for clustering a plurality of geographically different resources into a plurality of clusters of proximate resources. The system may include means for calculating a cost of transporting each resource to each of a plurality of destinations. The system may include means for mapping each cluster to one of the destinations to determine a sum of costs of transporting all of the resources to the destinations. One or more of the destinations may be a destination to which is mapped, later, a cluster of resources. One or more of the destinations may be a destination to which is mapped, later, no cluster of resources.

The system may include means for establishing an initial data universe. The universe may include resource information, transportation information, destination information, and any other suitable information.

The resources may be plotted, based on their initial location, on a geographic grid, and, when all of the resources have different initial locations, no two resources will have identical logistical costs.

The sum may be a least sum of costs of transporting all of the resources to the destinations. The sum may include different transport segments between resource initial location and destination. For example, the sum may include a distance between the resource and a first transportation hub (a departure airport, for example), a distance between the first transportation hub and a second transportation hub (an arrival airport, for example), and a distance between the second transportation hub and a destination. This may reduce or avoid redundant calculation of routes, for example, between first and second transportation hubs, that may be traversed by multiple resources.

The mapping may be constrained to identify a set of destinations, each destination having a capacity, the set having an aggregate capacity sufficient to hold all of the resources.

The system may include means for assigning each resource to one of the destinations based on: the mapping; and a net cost of remapping the resource to a next-more-costly destination.

The system may include means for assigning to each of the plurality of destinations only resources: that are mapped to the destination; for which the destination has sufficient capacity to accommodate the resources; and whose assignment to the destination does not exclude from the destination, by filling the capacity, a different resource that is: mapped to the destination; and has a net cost that is higher than a net cost of the resource of the assignment.

The system may include means for providing, for a first of the resources, a first resource record including, for each of the destinations, a first net cost of remapping the first resource to a next more-costly destination. The system may include providing, for a second of the resources, a second resource record including, for each of the destinations, a second net cost of remapping the second resource to a next more-costly destination. The system may include means for identifying a destination, of the plurality of destinations, for which the first and second net costs are equal. The system may include means for changing the second record so that the second net cost is less than the first net cost.

The system may include means for calculating for each cluster a sum of costs of transporting each resource in the cluster to the one of the destinations to which the cluster is mapped. The clustering may be a clustering that is not constrained to a predetermined number of clusters. The clustering may be a clustering that is not constrained by a user to a predetermined number of clusters. The system may receive from a user a number $J_u$ of clusters. The system may identify a number J of clusters to map to the destinations. J may be equal to $J_u$. J may be less than $J_u$.

The clustering may be a clustering that is without evaluating a metric for each of $$\frac{M!}{J!(M-J)!}$$

partitions, wherein M is the number of resources and J is the number of clusters. The metric may include a distance. The metric may include a cost.

The system may include means for identifying a destination to which both a first of the clusters and a second of the clusters have been mapped. The system may include means for remapping, when the destination is a first of the destinations, the second of the clusters from the first of the destinations to a second of the destinations, if the first of the destinations has a capacity that is insufficient for both the first of the clusters and the second of the clusters. The second of the destinations may be different from the first of the destinations. The second of the destinations may be distinct from the first of the destinations.

The remapping may include evaluating for each resource in the second cluster a net cost of remapping the resource to each destination in the plurality of destinations. The remapping may include summing, for each destination, the net costs. The remapping may include selecting as the second destination that destination having the lowest net cost.

The system may include means for calculating, after the selecting, for each cluster, a sum of costs of transporting each resource in the cluster to the one of the destinations to which the cluster is mapped.

The system may include means for repeating the identifying and the remapping until an aggregate capacity of a set of destinations is sufficient to accommodate all of the resources.

The system may include means for evaluating for each resource a net cost, for each of the destinations to which the resource is not mapped, of remapping the resource from that destination to which the resource is mapped to that destination to which the resource is not mapped.

The system may include means for assigning to each of the plurality of destinations only resources: that are mapped to the destination; for which the destination has capacity; and whose assignment to the destination does not exclude from the destination, by filling the destination, a different resource that is: mapped to the destination; and has a net cost of remapping that is higher than the resource of the assignment.

The system may include means for identifying, before the assigning: a first resource record in which there is a first net cost; and a second resource record in which there is a second net cost, the first and second net costs being equal. The system may include means for changing the second record so that the second net cost is less than the first net cost.

The methods may include methods for machine-based planning. The methods may include clustering a plurality of geographically different resources into a plurality of clusters of proximate resources. The methods may include calculating a cost of transporting each resource to each of a plurality of destinations. The methods may include mapping each cluster to one of the destinations to determine a sum of costs of transporting all of the resources to the destinations. The sum may be a least sum of costs of transporting all of the resources to the destinations. The mapping may be a mapping that is constrained to identify a set of destinations, each destination having a capacity, the set having an aggregate capacity sufficient to hold all of the resources. One or more of the destinations may be a destination to which is mapped, later, a cluster of resources. One or more of the destinations may be a destination to which is mapped, later, no cluster of resources.

The methods may include assigning each resource to one of the destinations based on: the mapping; and a net cost of remapping the resource to a next-more-costly destination.

The methods may include assigning to each of the plurality of destinations only resources: that are mapped to the destination; for which the destination has sufficient capacity to accommodate the resources; and whose assignment to the destination does not exclude from the destination, by filling the capacity, a different resource that is: mapped to the destination; and has a net cost that is higher than a net cost of the resource of the assignment.

The methods may include providing, for a first of the resources a first resource record including, for each of the destinations, a first net cost of remapping the first resource to a next more-costly destination. The methods may include providing, for a second of the resources a second resource record including, for each of the destinations, a second net cost of remapping the second resource to a next more-costly destination. The methods may include identifying a destination, of the plurality of destinations, for which the first and second net costs are equal. The methods may include changing the second record so that the second net cost is less than the first net cost.

The methods may include calculating for each cluster a sum of costs of transporting each resource in the cluster to the one of the destinations to which the cluster is mapped.

The clustering may be a clustering that is not constrained to a predetermined number of clusters. The clustering may be a clustering that is not constrained by a user to a predetermined number of clusters. The methods may include receiving from a user a number N of clusters. The methods may identify a number M of clusters to map to the destinations. M may be equal to N. M may be less than N.

The clustering may be a clustering that is without evaluating a metric for each of $$\frac{M!}{J!(M-J)!}$$

partitions, wherein M is the number of resources and J is the number of clusters. The metric may include a distance. The metric may include a cost.

The methods may include identifying a destination to which both a first of the clusters and a second of the clusters have been mapped.

The methods may include, when the destination is a first of the destinations, remapping the second of the clusters from the first of the destinations to a second of the destinations only if the first of the destinations has a capacity that is insufficient for both the first of the clusters and the second of the clusters; wherein the second of the destinations is different from the first of the destinations.

The remapping may include evaluating for each resource in the second cluster a net cost of remapping the resource to each destination in the plurality of destinations. The remapping may include summing, for each destination, the net costs. The remapping may include selecting as the second destination that destination having the lowest net cost.

The methods may include, after the selecting, calculating for each cluster a sum of costs of transporting each resource in the cluster to the one of the destinations to which the cluster is mapped.

The methods may include repeating the identifying and the remapping until an aggregate capacity of a set of destinations is sufficient to accommodate all of the resources.

The methods may include evaluating for each resource a net cost, for each of the destinations to which the resource is not mapped, of remapping the resource from that destination to which the resource is mapped to that destination to which the resource is not mapped.

The methods may include assigning to each of the plurality of destinations only resources: that are mapped to the destination; for which the destination has capacity; and whose assignment to the destination does not exclude from the destination, by filling the destination, a different resource that is: mapped to the destination; and has a net cost of remapping that is higher than the resource of the assignment.

The methods may include, before the assigning: identifying: a first resource record in which there is a first net cost; and a second resource record in which there is a second net cost, the first and second net costs being equal; and changing the second record so that the second net cost is less than the first net cost.

Illustrative embodiments of apparatus and methods in accordance with the principles of the invention will now be described with reference to the accompanying drawings, which form a part hereof. It is to be understood that other embodiments maybe utilized and that structural, functional and procedural modifications may be made without departing from the scope and spirit of the present invention.

Processes in accordance with the principles of the invention may include one or more features of the apparatus or processes illustrated in FIGS. 1-30. For the sake of illustration, the steps of the illustrated processes will be described as being performed by a "system." The "system" may include one or more of the features of the apparatus that are shown in FIGS. 18-22 and/or any other suitable device or approach. The "system" may include one or more means for performing one or more of the steps described herein.

FIG. 1 shows illustrative steps of process 100 for machine-based planning. Process 100 may begin at step 102. At step 102, the system may condition resource and other data. At step 104, the system may determine a set of destinations that, in aggregate, are sufficient to accommodate the resources. At step 106, the system may assign each of the resources to a destination. At step 108, the system may perform sensitivity analysis to provide a quantitative measure of savings relative to a next-best assignment of the resources.

Figure 2:
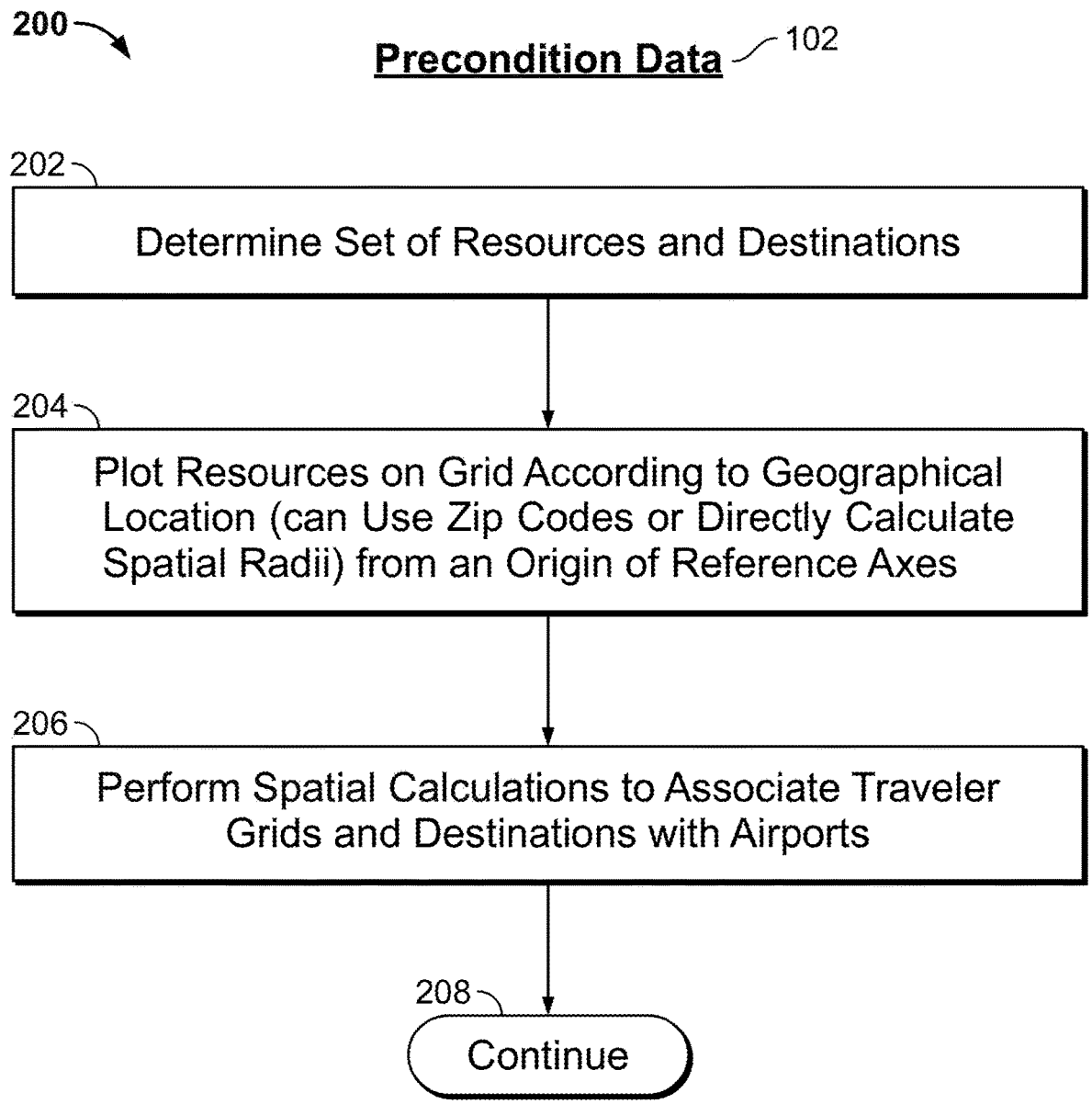
FIG. 2 shows illustrative process steps in accordance with principles of the invention.

FIG. 2 shows illustrative steps of process 200, that may be performed in connection with step 102 of process 100 (shown in FIG. 1). Process 200 may begin at step 202. At step 202, the system may determine, for example, from a look up table, geographic coordinates of resources, destinations, transportation hubs, or any other suitable elements related to the planning. Table 1 shows illustrative resources, destinations, and transportation centers.

TABLE 1

Illustrative resources, destinations, and transportation centers

| Illustrative Resources | Illustrative Destinations | Illustrative Transportation Hubs |
|---|---|---|
| Human traveler | Hotel | Airport |
| Livestock | Conference center | Marine Port |
| Parcels | Resort | Rail Station |
| Raw materials | Academic Institution | Bus station |
| Shipping containers | Business Institution | Shipping Depot |
| | Government Facility | |
| | Research Site | |

At step 204, the system may "grid" the resources. The gridding may include plotting the resources on a geographic grid.

At step 206, the system may calculate one or more distances for each resources. The distances may include one or more of a distance between the resource and the destinations, a distance between the resource and one or more transportation hubs, and the distance between one or more of the transportation hubs and one or more of the destinations.

At step 208, process 100 (shown in FIG. 1) may continue.

Figure 3:
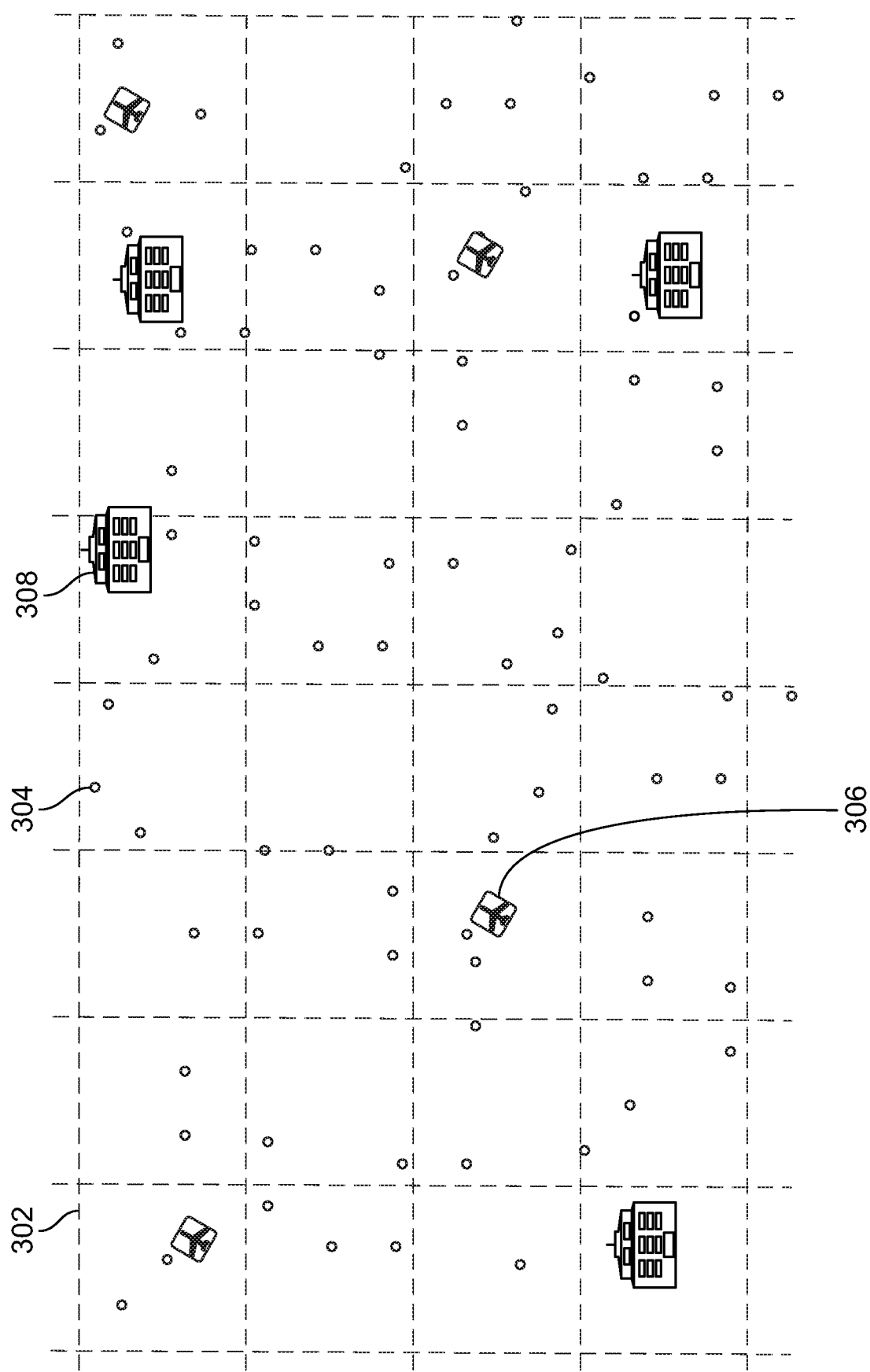
FIG. 3 shows schematically an arrangement of information in accordance with principles of the invention.

FIG. 3 shows illustrative geographic grid 302. The system, consistent with step 204 of process 200 (shown in FIG. 2), may plot illustrative resources 304 (at their initial locations) on grid 302. The system may plot illustrative transportation hubs 306 on the grid. The system may plot illustrative destinations 308 on the grid.

Figure 4:
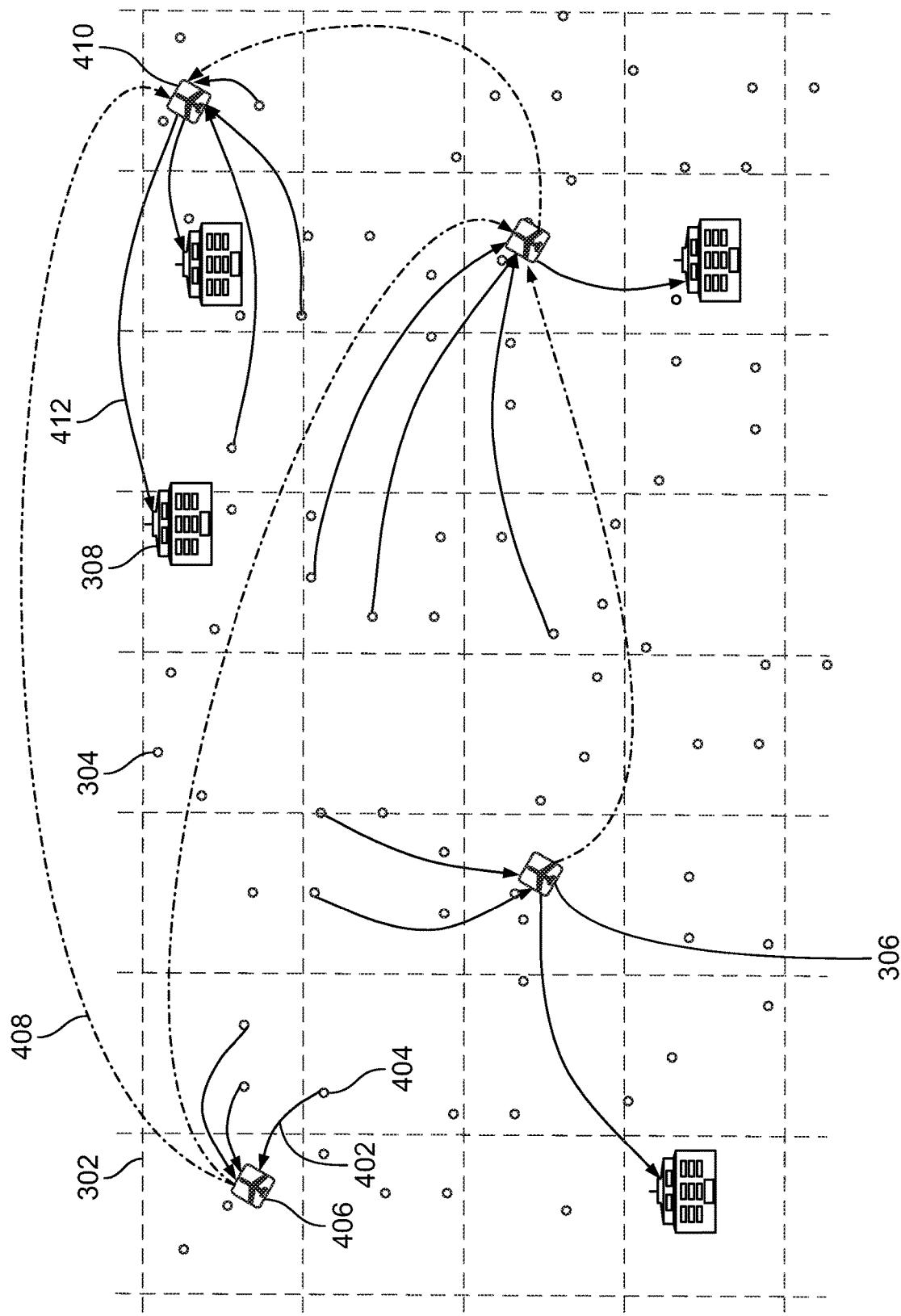
FIG. 4 shows schematically an arrangement of information in accordance with principles of the invention.

FIG. 4 shows that the system, consistent with step 206 of process 200 (shown in FIG. 2), may calculate distances, such as distance 402 between resource 404 and transportation hub 406; distance 408 between transportation hub 406 and transportation hub 410, and distance 412 between transportation hub 410 and destination 412.

Figure 5:
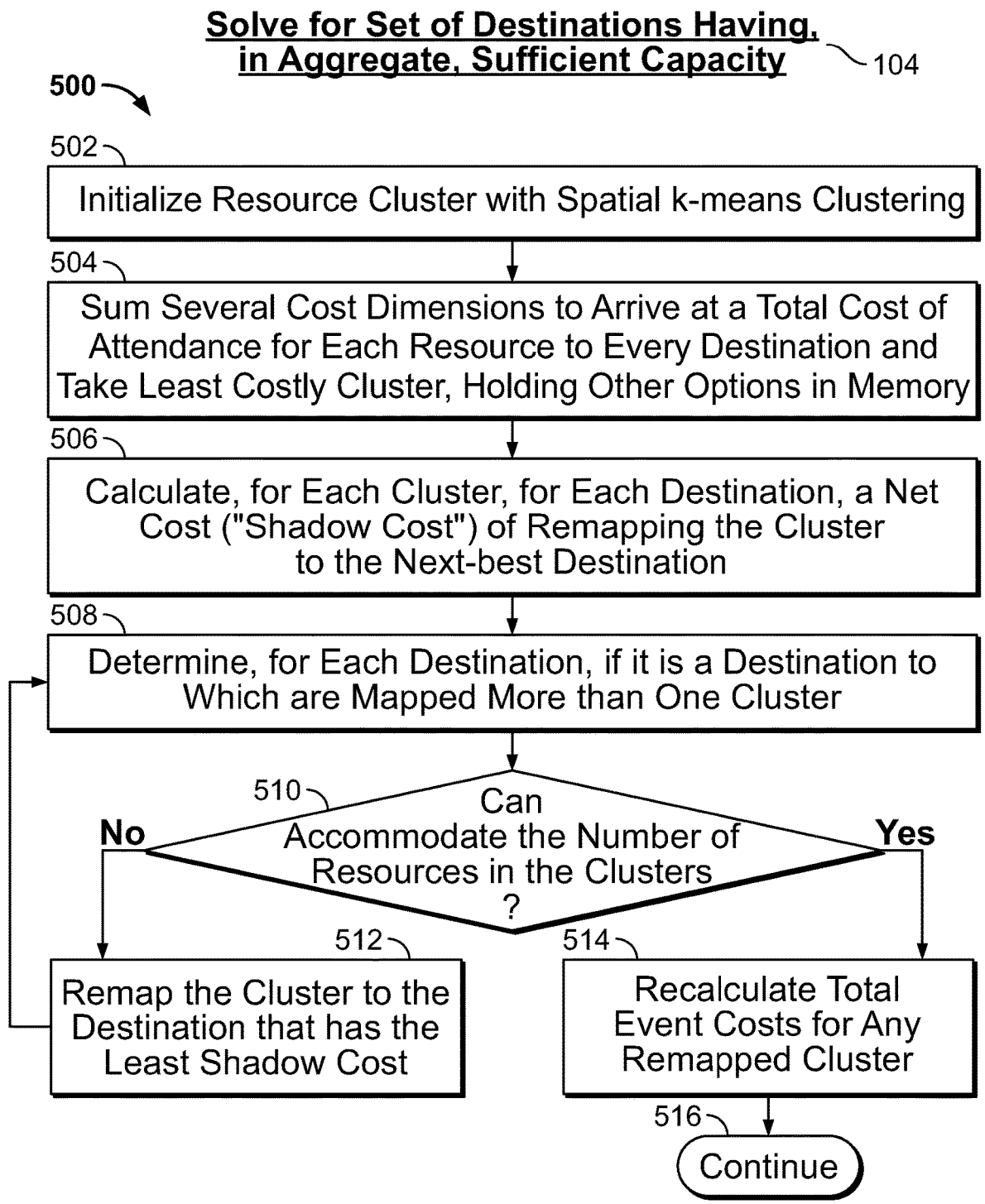
FIG. 5 shows illustrative process steps in accordance with principles of the invention.

FIG. 5 shows illustrative steps of process 500, that may be performed in connection with step 104 of process 100 (shown in FIG. 1). Process 500 may begin at step 502. At step 502, the system may group the resources into clusters based on proximity of the resources to each other. The number of clusters may be determined by a user. The clusters may be determined using spatial k-means clustering.

At step 504, the system may calculate, for each cluster, a cost, for each destination, of transporting all resources in the cluster to the destination. The system may map the cluster to the destination having the lowest cost. The costs may be retained in memory for subsequent use in the methods.

At step 506, the system may calculate, for each cluster, for each destination, a net cost ("shadow cost") of remapping the cluster to the next-best (next-most-inexpensive, e.g.) destination.

At step 508, the system may determine, for each destination, if it is a destination to which are mapped multiple clusters. At step 510, the system may determine for each such destination whether the destination may accommodate the resources of the multiple clusters.

If "NO," process 500 may continue at step 512. At step 512, the system may remap one of the multiple clusters to the destination having the least shadow cost. The system may then return to step 508 until all of the resources of all of the clusters are accommodated by a set of destinations. The clusters may be mapped, in the aggregate to fewer than all of the available destinations, such as those illustrated in FIG. 3.

At step 516, process 100 (shown in FIG. 1) may continue.

If "YES," or when "YES," in the event that remapping was required, process 500 may continue at step 514. At step 514, the system may recalculate for each cluster, the cost, for each destination, of transporting all resources in the cluster to the destination.

Figure 6:
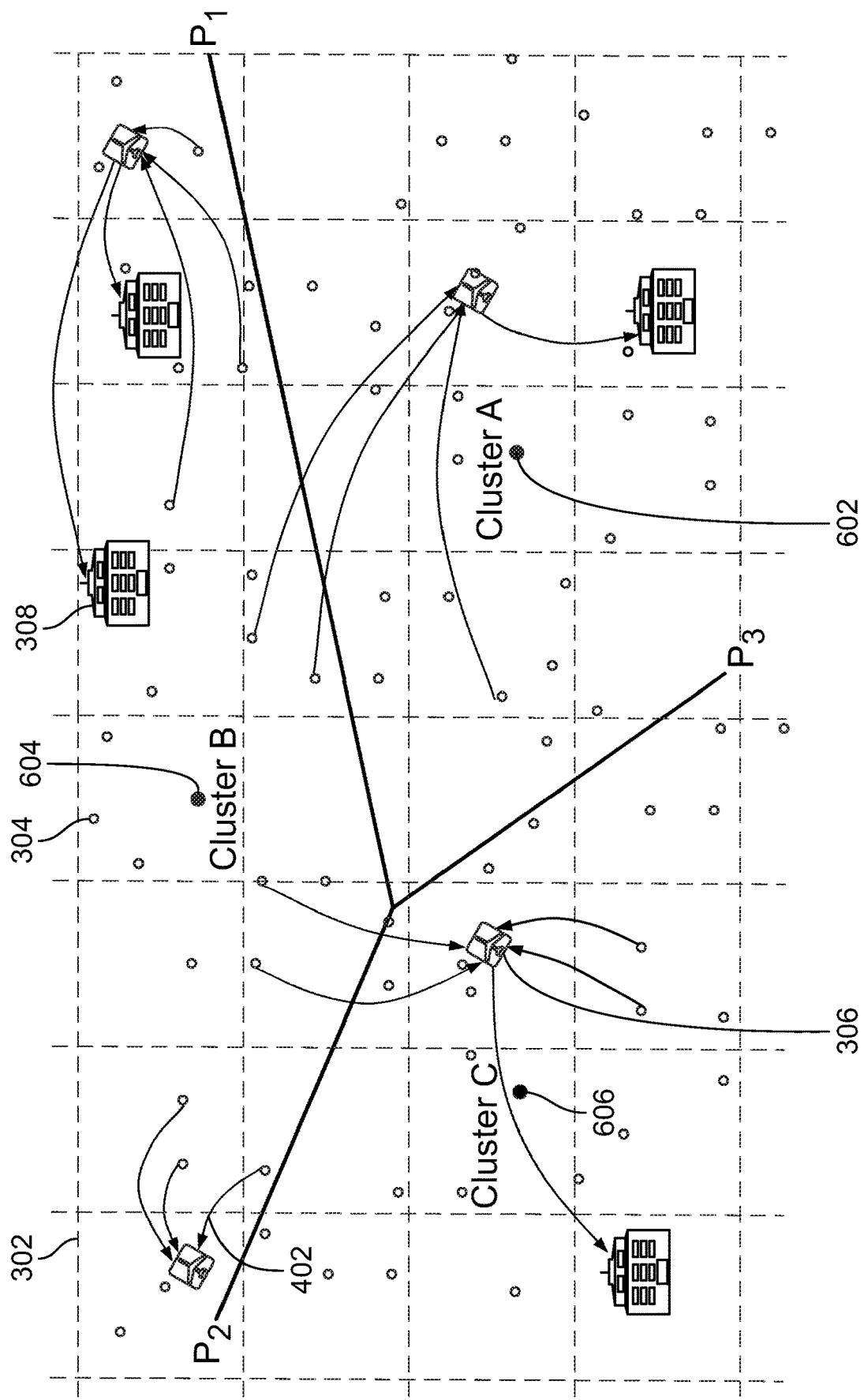
FIG. 6 shows schematically an arrangement of information in accordance with principles of the invention.

FIG. 6 shows grid 302 along with resources 304, transportation hubs 306, destinations 308 (shown in FIG. 3) and distances such as 402 (shown in FIG. 4), which extend between resources 304 and transportation hubs 306. The system, consistent with step 502 (shown in FIG. 5), may apply k-means clustering to resources 304 to solve for and plot cluster means 602, 604 and 606, which correspond to Clusters A, B and C, respectively. Cluster partitions P1, P2 and P3 delineate between the resources of the different Clusters. The resources may be clustered with respect to their displacement from a reference point. The reference point may be arbitrary. The reference point may be one of resources 304, transportation hubs 306, destinations 308, or any other suitable reference point.

Figure 7:
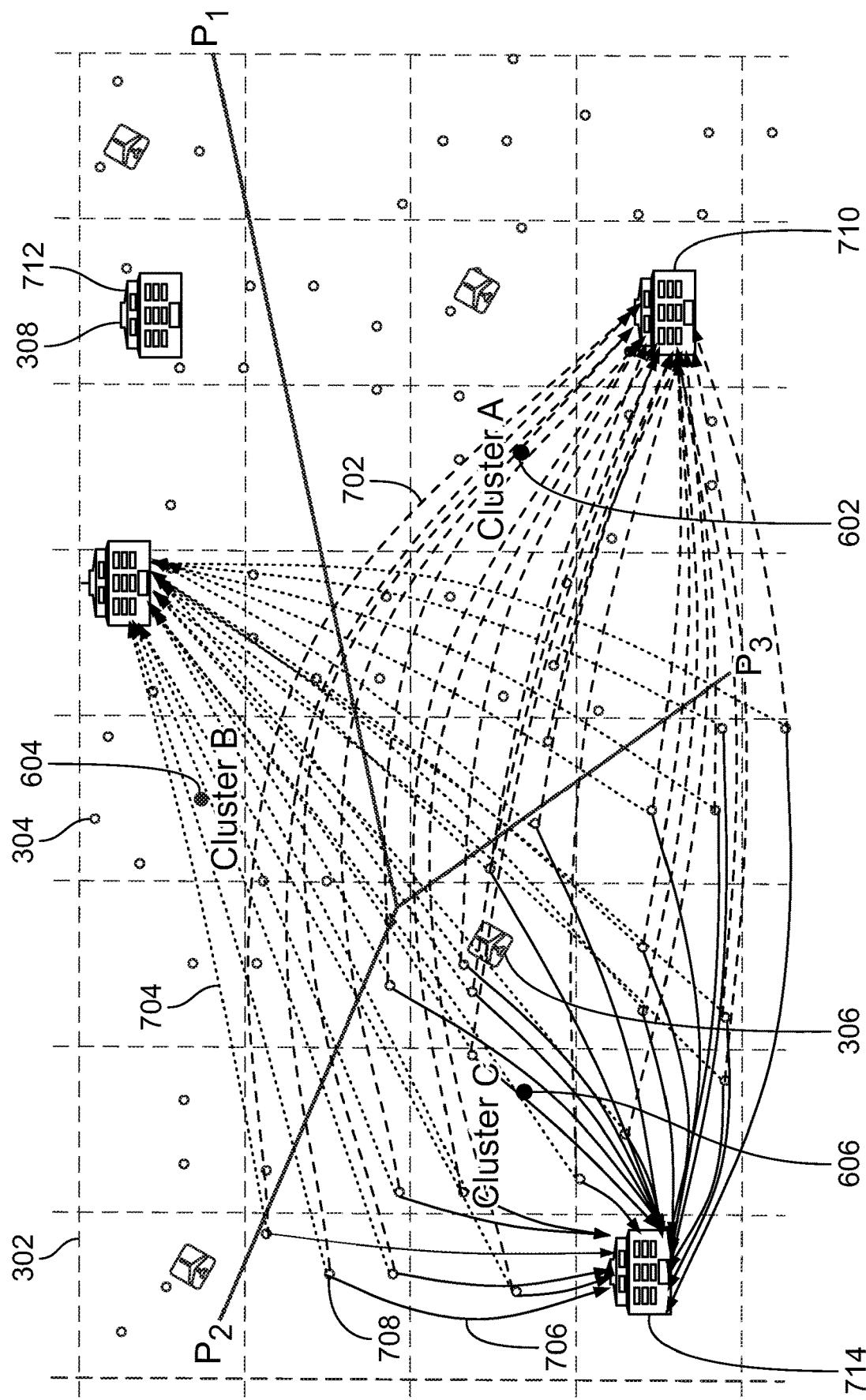
FIG. 7 shows schematically an arrangement of information in accordance with principles of the invention.

FIG. 7 shows routes 702, 704 and 706 running from all Cluster C resources 708 each of destinations 710, 712 and 714. The system, consistent with step 504 of process 500 (shown in FIG. 5), may calculate costs of transporting all the Cluster C resources 708 to each of destinations 710, 712 and 714.

The system may perform analogous calculations for Clusters B and C.

Intermediate route segments, such as between resource and transportation hub are not shown, but may be included in the calculation. The system may calculate for each resource-destination pair a cost for each of multiple different intermediate route segments. The system may choose the least costly combination of intermediate route segments for each resource-destination pair.

Figure 8:
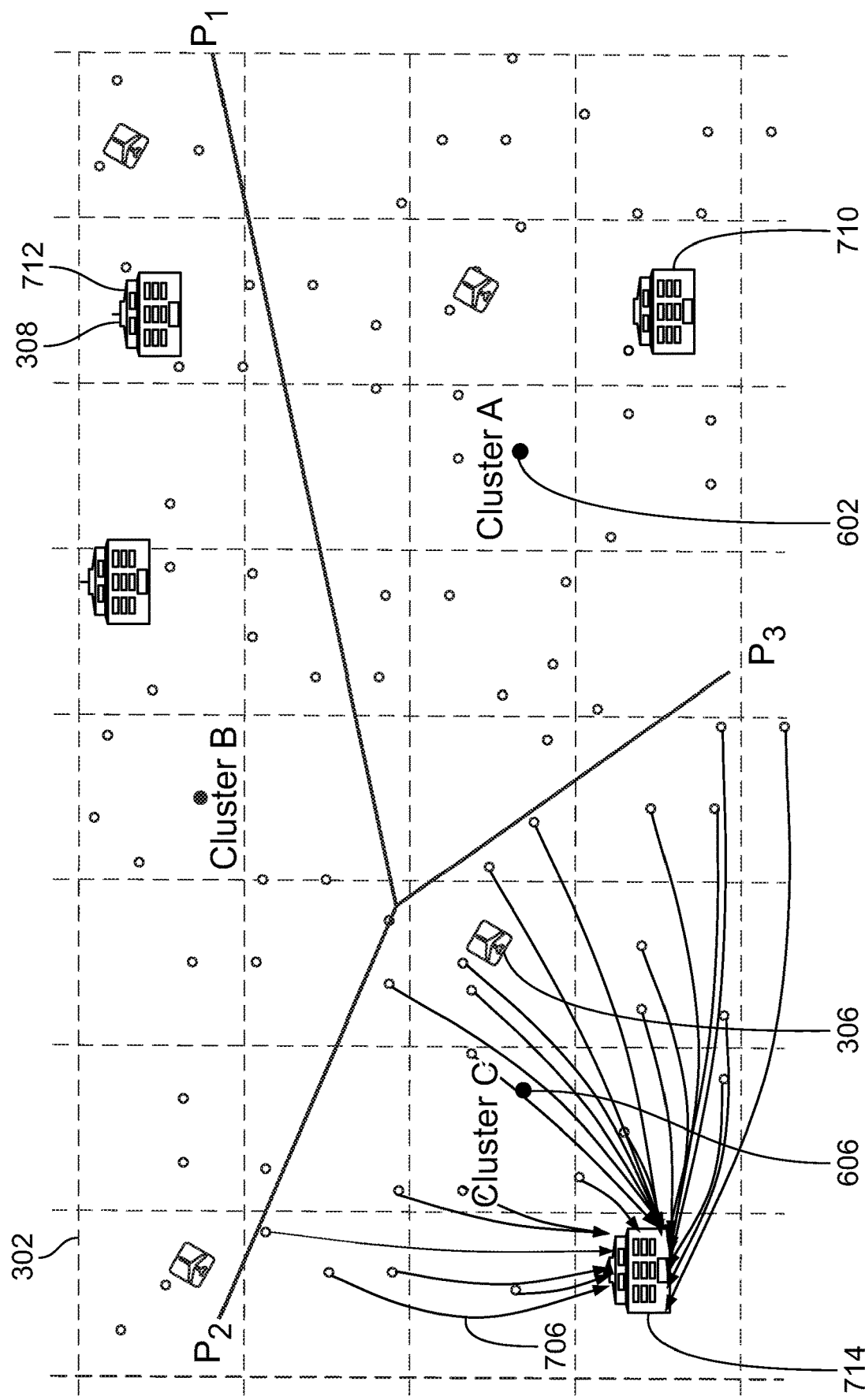
FIG. 8 shows schematically an arrangement of information in accordance with principles of the invention.

FIG. 8 shows, by virtue of omission of routes 702 and 704, that the system may identify destination 714 as the least costly destination for Cluster C resources 706. The system may identify destination 714 as the initial destination for Cluster C.

Figure 9:
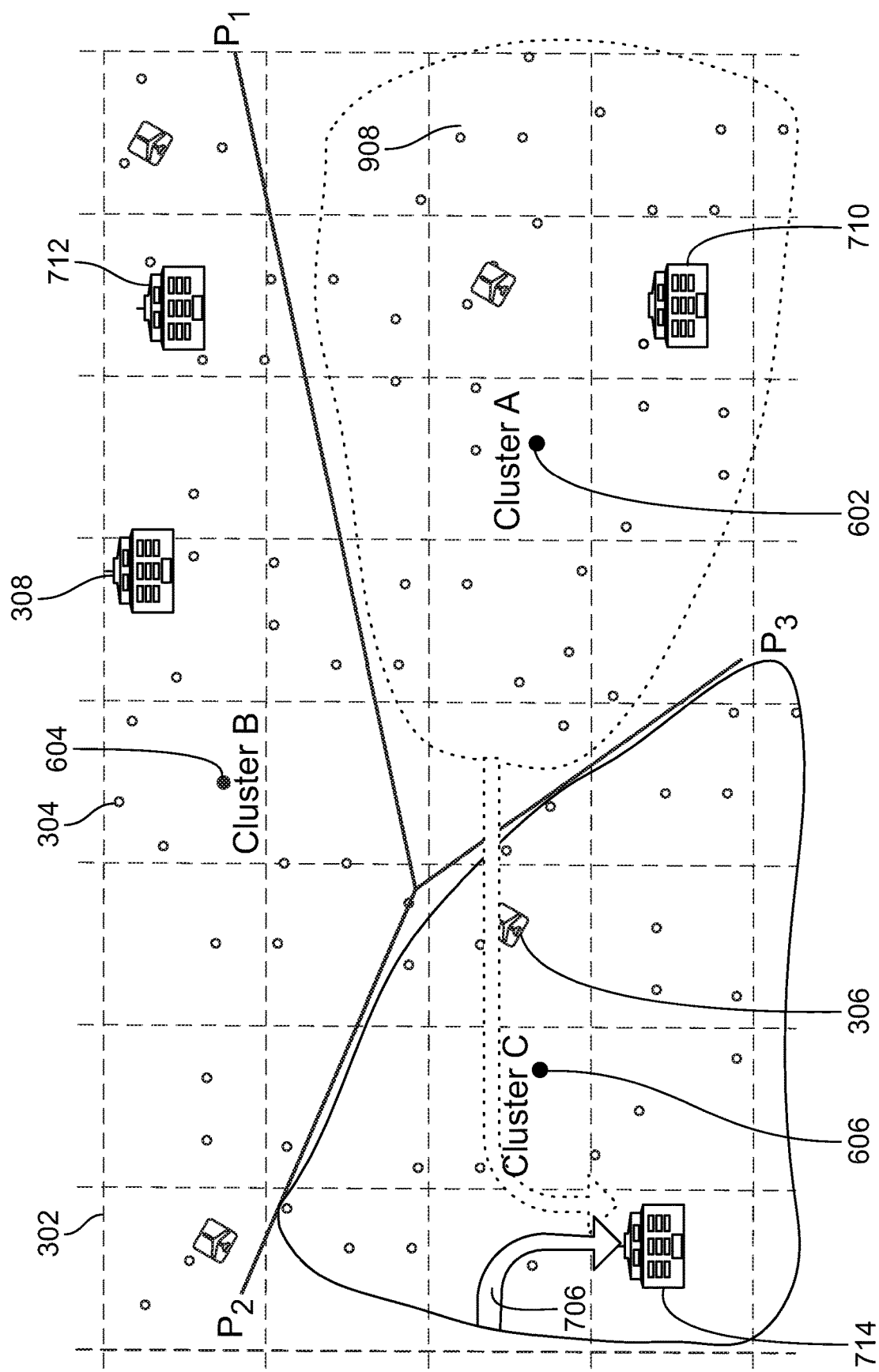
FIG. 9 shows schematically an arrangement of information in accordance with principles of the invention.

FIG. 9 shows an illustrative occurrence in which the system identifies destination 714 as the least costly destination also for Cluster A resources 908. The system may determine whether destination 714 may accommodate all of the resources in Clusters C and A. If not, the system may remap one of the Clusters to a different destination.

Figure 10:
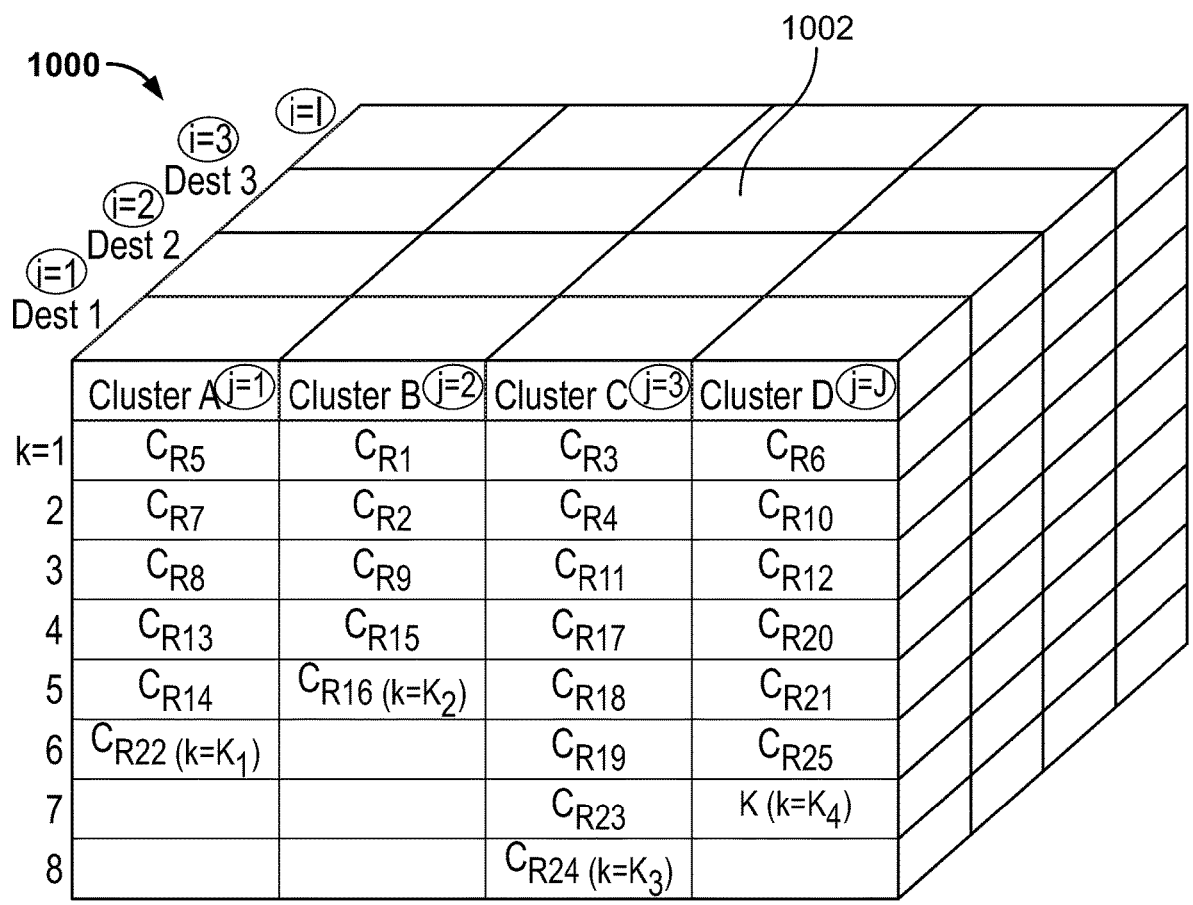
FIG. 10 shows schematically an arrangement of data in accordance with principles of the invention.

FIG. 10 shows schematically machine-readable memory 1000 having memory locations 1002 holding a transportation cost $C_{Rm}$ associated with a unique resource $R_m$ (m=1, 2, 3, . . . , M, where M is the total number of resources). C is the cost of transporting $R_m$ to destination $D_i$. Locations 1002 are referenced to a destination dimension (i=1, 2, 3, . . . , I, each corresponding to a destination), a cluster dimension (j=1, 2, 3, . . . , J, each corresponding to a cluster), and a resource dimension ($k_j$=1, 2, 3, . . . $K_j$, each corresponding to a resource, and $K_j$ indicating the last resource on the list for the $j^{th}$ cluster).

The system use Equation 1, below, to calculate a total cost $C_{Tj,i}$ for each cluster-destination pair.

$$C_{Tj,i} = \Sigma_{k=1}^{Kj} C_{Rm_k} \qquad \text{Eq'n 1.}$$

The system may use Equation 2, below, to initially map cluster j to destination $i_0$.

$$C_{Tj,i_0} = (C_{Tj,i})_{min,\forall i}. \qquad \text{Eq'n 2}$$

The system may use Equation 2, below to calculate shadow costs Cs for each cluster-destination pair.

$$C_{Sj,i} = C_{Tj,i^*} - C_{Tj,i} \qquad \text{Eq'n 3.}$$

where i* indicates the destination, of all the destinations, having the least excess cost over $C_{Tj,i}$.

In a first remapping, the system may apply Equation 4, below:

$$C_{Sj,i} = C_{Tj,i^*} - C_{Tj,i_0}. \qquad \text{Eq'n 4}$$

A cluster, such as cluster A (shown in FIG. 9), may be remapped to a different destination that has the least shadow cost.

Figure 11:
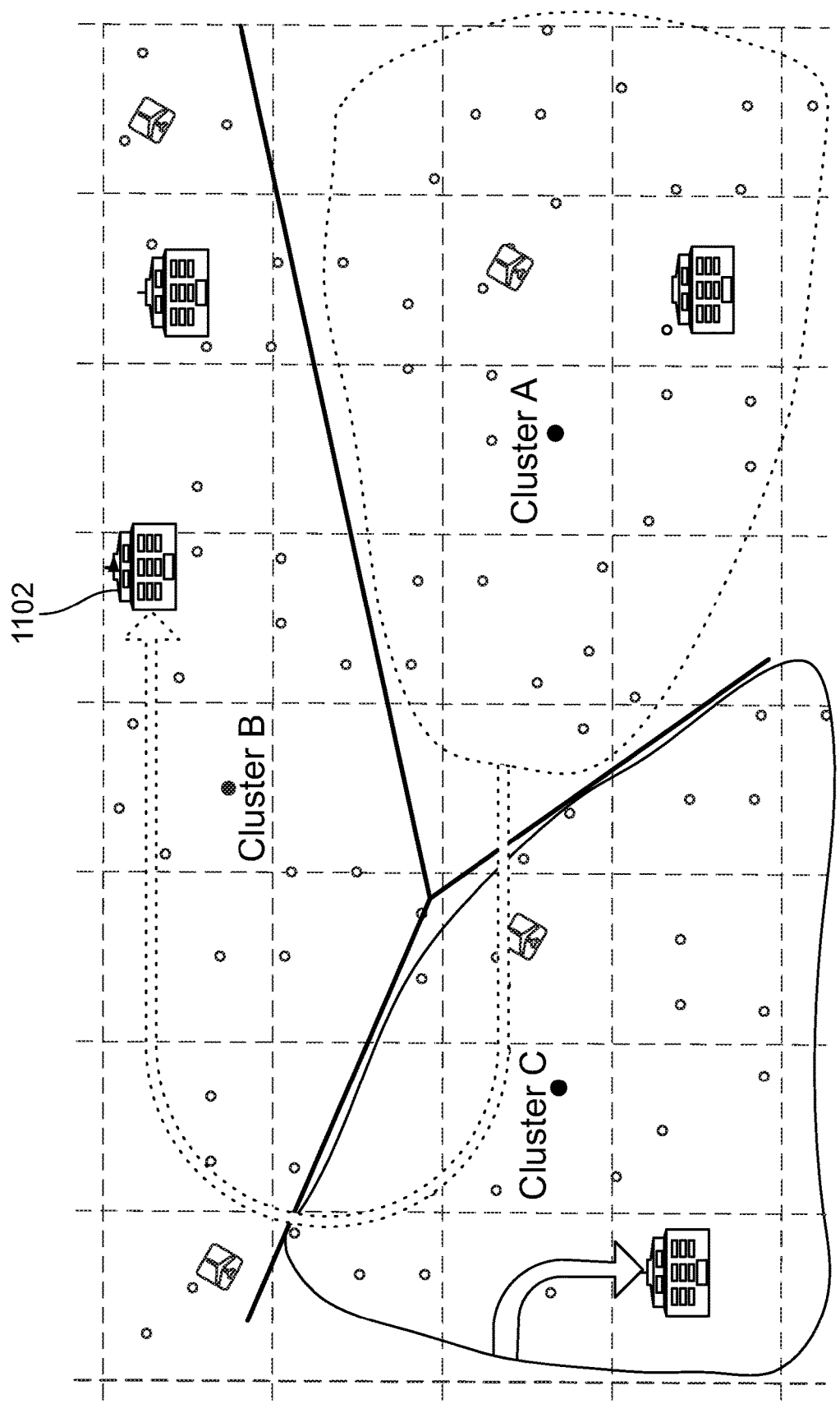
FIG. 11 shows schematically an illustrative arrangement of information in accordance with principles of the invention.

FIG. 11 shows Cluster A remapped to destination 1102.

Figure 12:
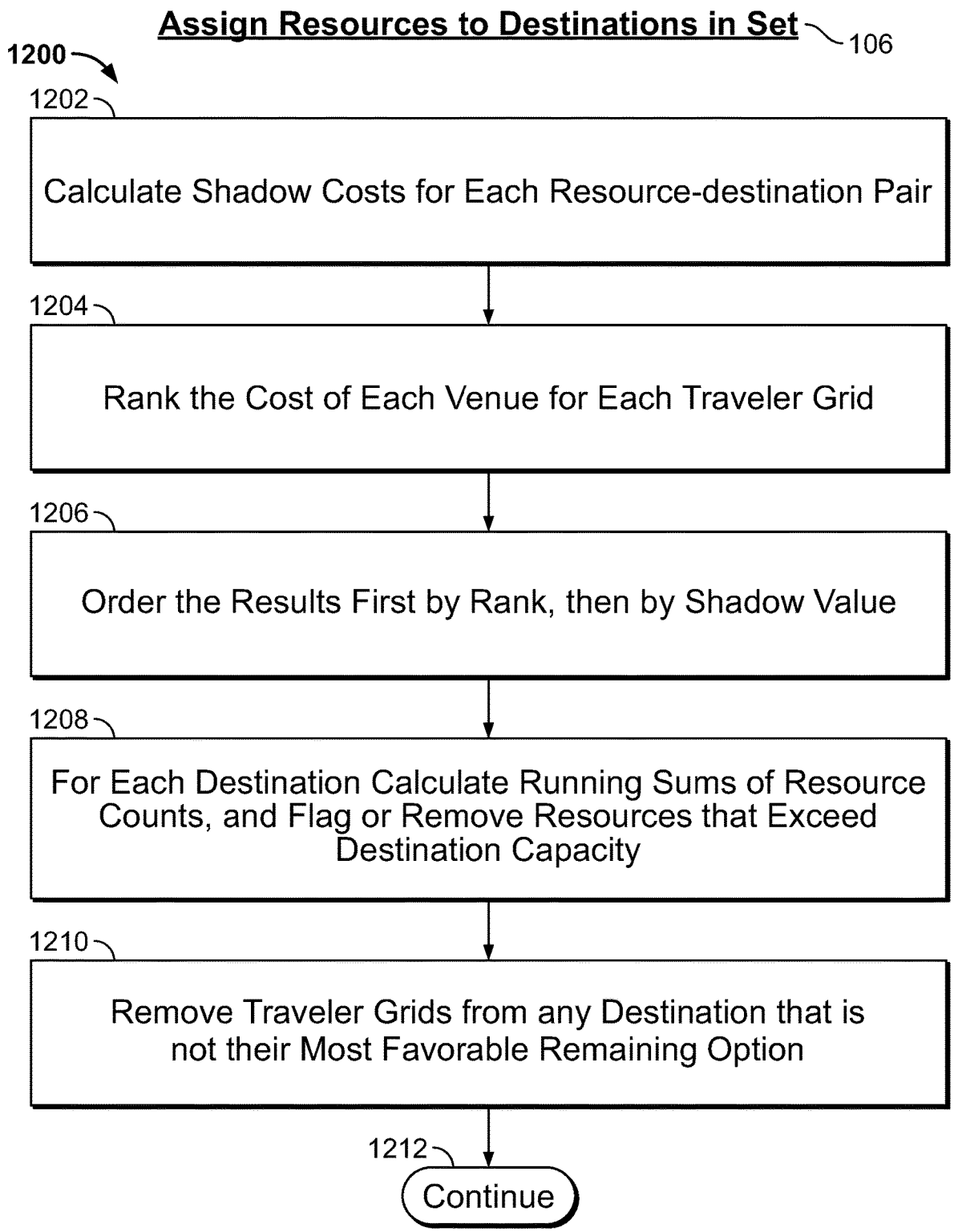
FIG. 12 shows illustrative process steps in accordance with principles of the invention.

FIG. 12 shows illustrative steps of process 1200 that may be performed in connection with step 106 of process 100 (shown in FIG. 1). Process 1200 may begin at step 1202.

At step 1202, the system may simplify resource data by ranking in increasing order, for each resource Rm, costs $C_{Rm}$. The system may flag a destination that is the most costly destination for a resource, because such a destination does not have a more-costly destination, and therefore does not have a shadow cost. The flag may be a "dummy" value.

At step 1204, the system may calculate shadow values, analogous to the cluster shadow costs $C_{Sj,i}$ for each individual resource Rm, for example, as set forth in Equation 5, below.

$$C_{SRm} = C_{Rm_{i^*}} - C_{Rm_{\hat{i}}} \qquad \text{Eq'n 5,}$$

where $\hat{i}$ indicates the destination to which resource Rm was assigned after mapping and any remapping, and i* indicates the destination, of all the destinations, having the least excess cost (for transporting Rm as an individual) over destination $\hat{i}$.

At step 1206, the system may order the resources Rm first by mapped destination (i*) and then by shadow cost CSRm. For example, a top stratum of the ranking would list all resources mapped to (having i*=1) destination 1. Within that stratum the resources Rm would be ranked by CSRm, indicating how costly it would be to remap Rm to the next best destination.

At step 1208, the system may, for each destination, calculate running sums of resource count, and remap, to a different destination, based on shadow cost, resources that exceed destination capacity.

Based on the prior clustering, when step 1208 is completed, each resource will be assigned to at least one destination in the most cost-effective manner without requiring the execution of $$n \frac{n!}{k!(n-k)!}$$

processor steps to group the resources.

At step 1210, the system may remove from a destination any resource for which the destination is not the least costly.

At step 1212, process 100 (shown in FIG. 1) may continue.

Figure 13:
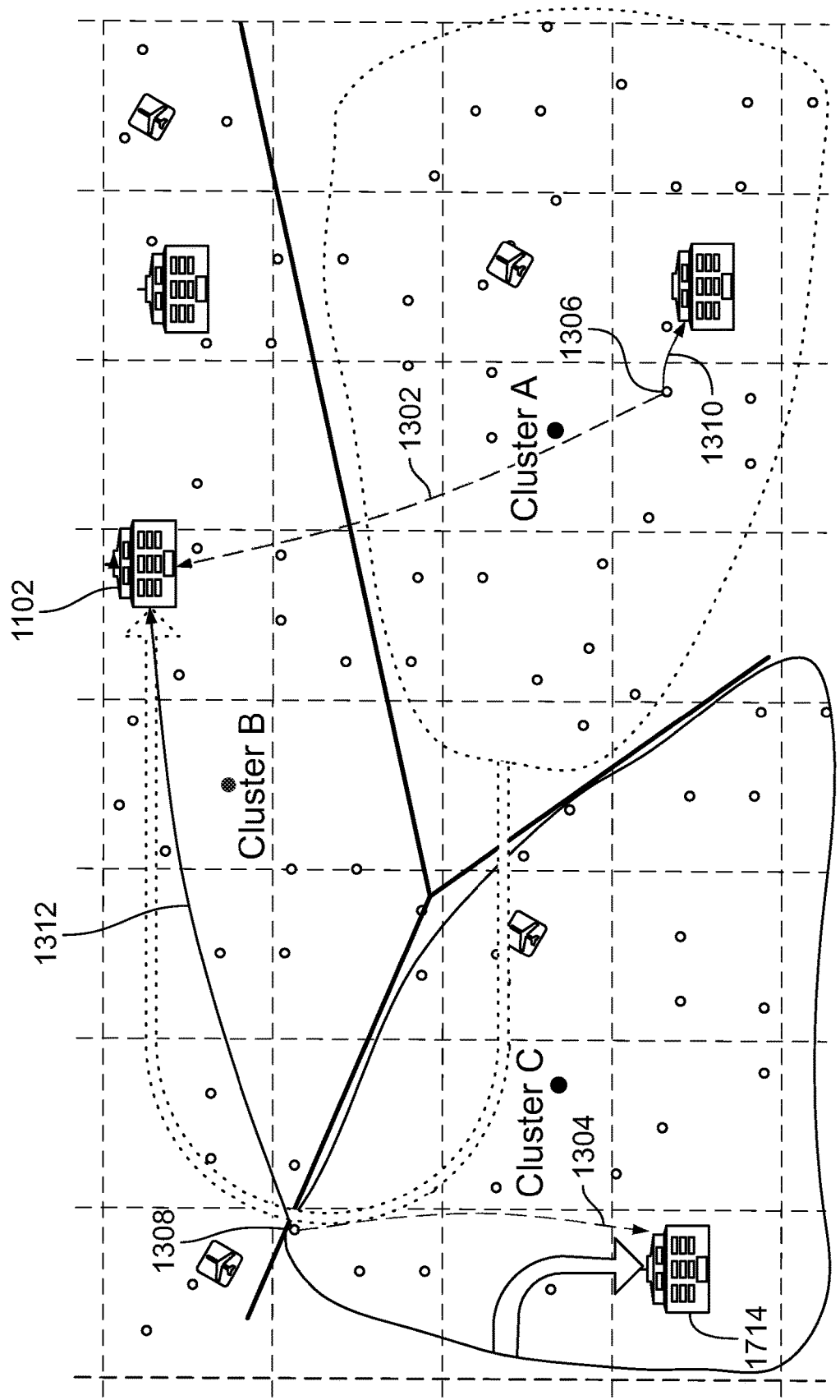
FIG. 13 shows schematically an illustrative arrangement of information in accordance with principles of the invention.

FIG. 13 shows illustrative costs 1302 and 1304 for transporting resources 1306 and 1308, respectively, to destinations 1102 and 1714, respectively, which are the destinations to which the resources are mapped by virtue of their respective clusters, as shown in FIG. 9. Costs 1310 and 1312 are for transporting resources 1306 and 1308 to their respective next most-expensive (and, perhaps, less expensive) destinations. The differences between costs 1302 and 1304, and 1310 and 1312, are shadow costs, consistent with step 1204 of process 1200 (shown in FIG. 12). (A negative shadow cost may occur when a cluster includes resource that is far from the cluster-mapped destination and close to a different destination.)

Figure 14:
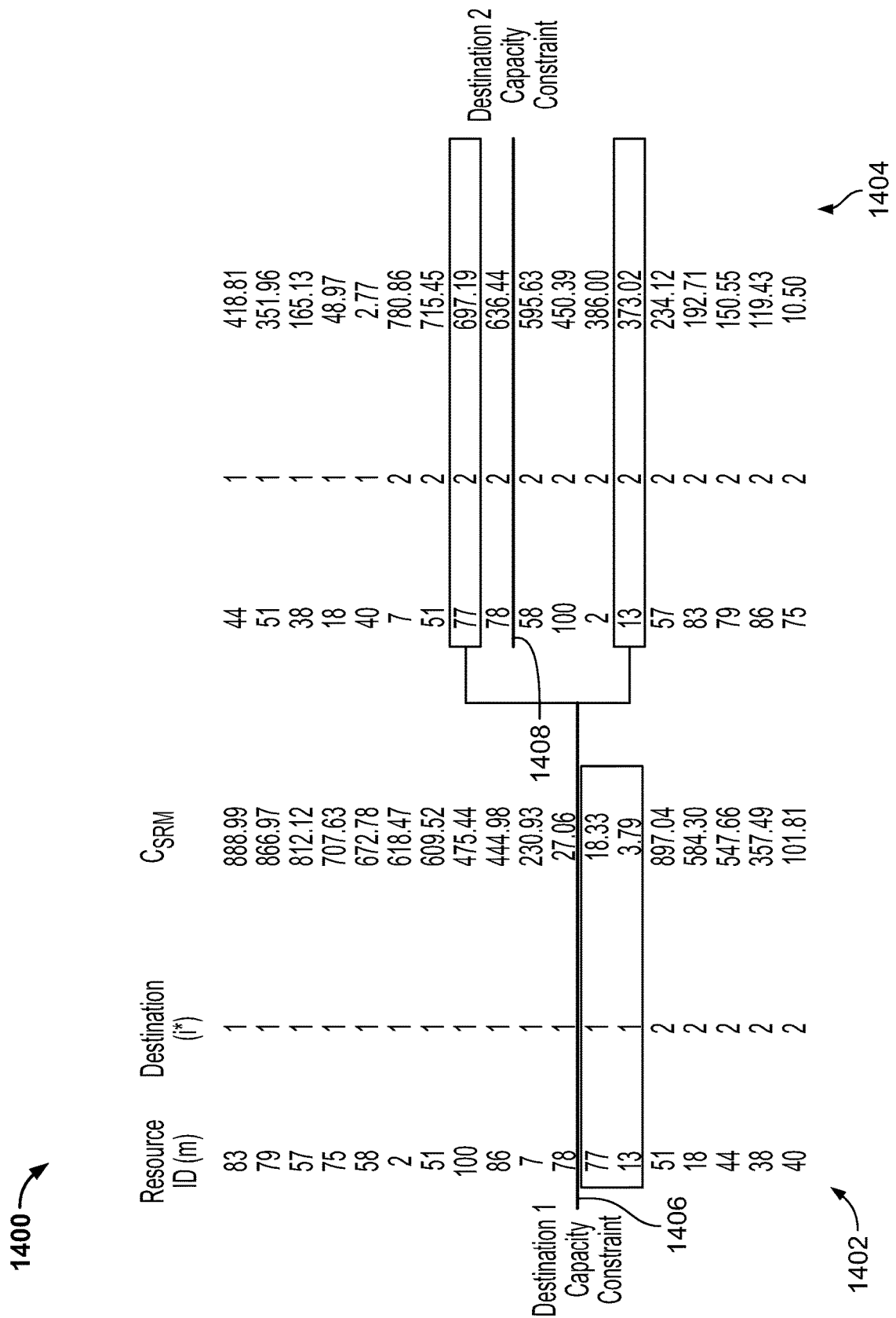
FIG. 14 shows illustrative information in accordance with principles of the invention.

FIG. 14 shows information 1400, including data sets 1402 and 1404, that the system may use to assign resources to destinations based on the prior cluster-mapping and individual resource shadow costs. Consistent with step 1206 of process 1200 (shown in FIG. 12), the system may rank resources Rm by destination i* and then by shadow cost CSRm. Resources R for m=83, 79, 57, 75, 58, 2, 51, 100, 86, 7, 78, 77 and 13 have been cluster-mapped to destination 1. They are ranked in descending order of shadow cost, so that the resources at bottom are less expensive to remap to a different destination. Resources R for m=51, 18, 44, 38 and 40 have been cluster-mapped to destination 2. Consistent with step 1208 of process 1200 (shown in FIG. 12), the system may keep a running count, from top to bottom of data set 1402, of resources R. At threshold 1406, resources R fill the capacity of destination 1. Resources 83, 79, 57, 75, 58, 2, 51, 100, 86, 7, 78 are assigned to destination 1. Resources 77 and 13 are excluded from destination 1.

The system may rank resources in the same manner in which they were ranked in data set 1402, but now fills destination 2 to threshold 1408.

FIG. 15 shows view 1500 of data set 1404 of information 1400 (shown in FIG. 14) at two stages: 1502 and 1504. At stage 1502, resources already assigned to destination 1 are identified. At stage 1504, those resources are removed from data set 1404. The system may now move the remaining resources "up." Resources 44, 51, 38, 18, 40, 77 and 13 are now above threshold 1508, and the system may assign those resources to destination 2.

Figure 16:
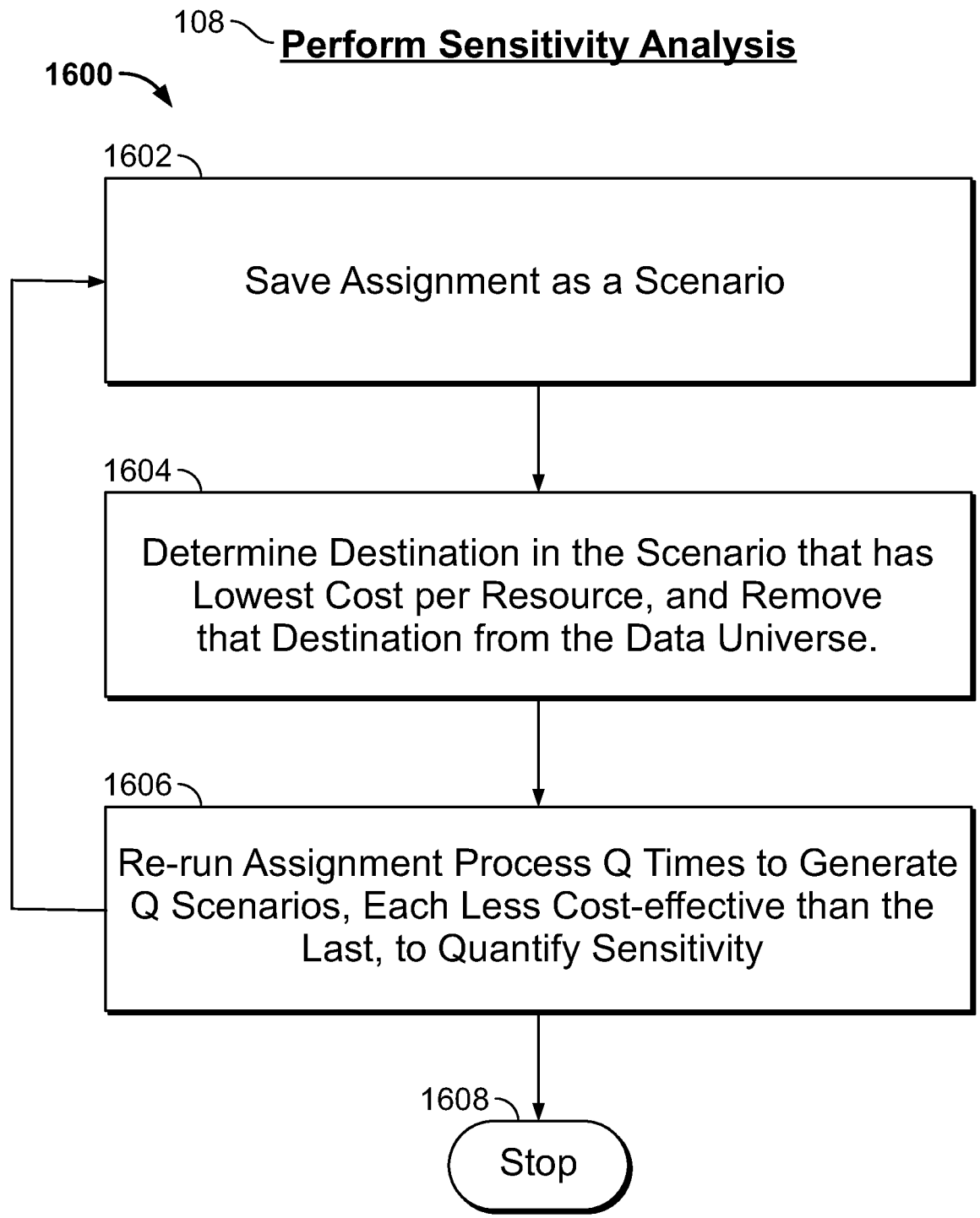
FIG. 16 shows illustrative process steps in accordance with principles of the invention.

FIG. 16 shows illustrative steps of process 1600 that may be performed in connection with step 108 of process 100 (shown in FIG. 1). Process 1600 may begin at step 1602.

At step 1602, the system may save the assignments of resources Rm to destinations i. The assignments may be saved as a $0^{th}$ order scenario.

At step 1604, the system may identify the destination having the least average cost per resource, as set forth in Equation 6.

$$\overline{D}_{min} = \left(\frac{\Sigma_{\forall Rm \supset destination\ i} CRm}{\text{number of resources} \supset \text{destination } i}\right)_{min, \forall Rm \supset destination\ i} \quad \text{Eq'n 6}$$

The system may remove $\overline{D}_{min}$ from the data universe and repeat process 100 (shown in FIG. 1).

At step 1606, process 1600 may return to step 1602. The system may save Q (q=1, 2, 3, . . . , Q) scenarios to illustrate cost savings of process 100.

Figure 17:
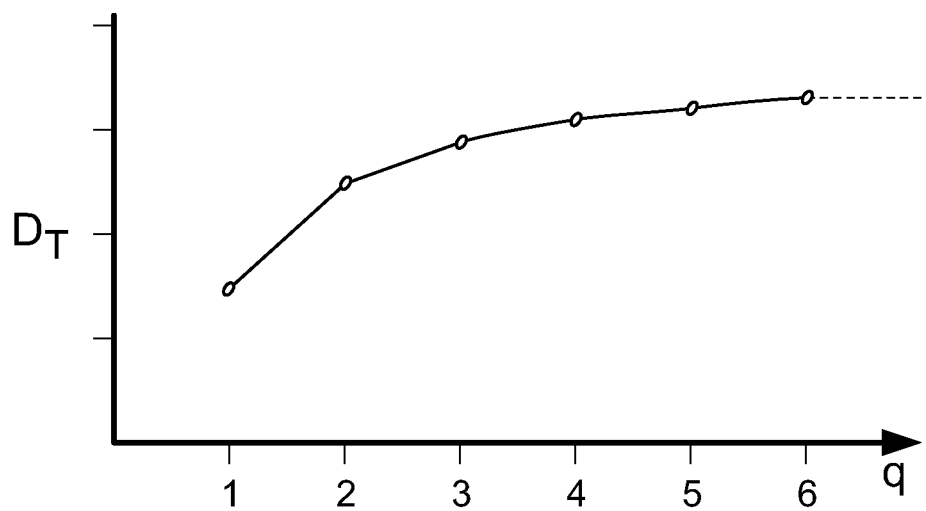
FIG. 17 shows illustrative information in accordance with principles of the invention.

FIG. 17 shows a hypothetical plot showing increasing total cost with successive removal of $\overline{D}_{min}$. Each of successive iterations yields a higher total cost $D_T$ (set forth in Eq'n 7, below) than the previous scenario, indicating success of process 100. The system may select different destinations (save those removed as a $\overline{D}_{min}$) from one iteration to the next.

$$D_T = \Sigma_{\forall i} \Sigma_{k=1}^{K_j} C_{Rm_k} \quad \text{Eq'n 7.}$$

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 18:
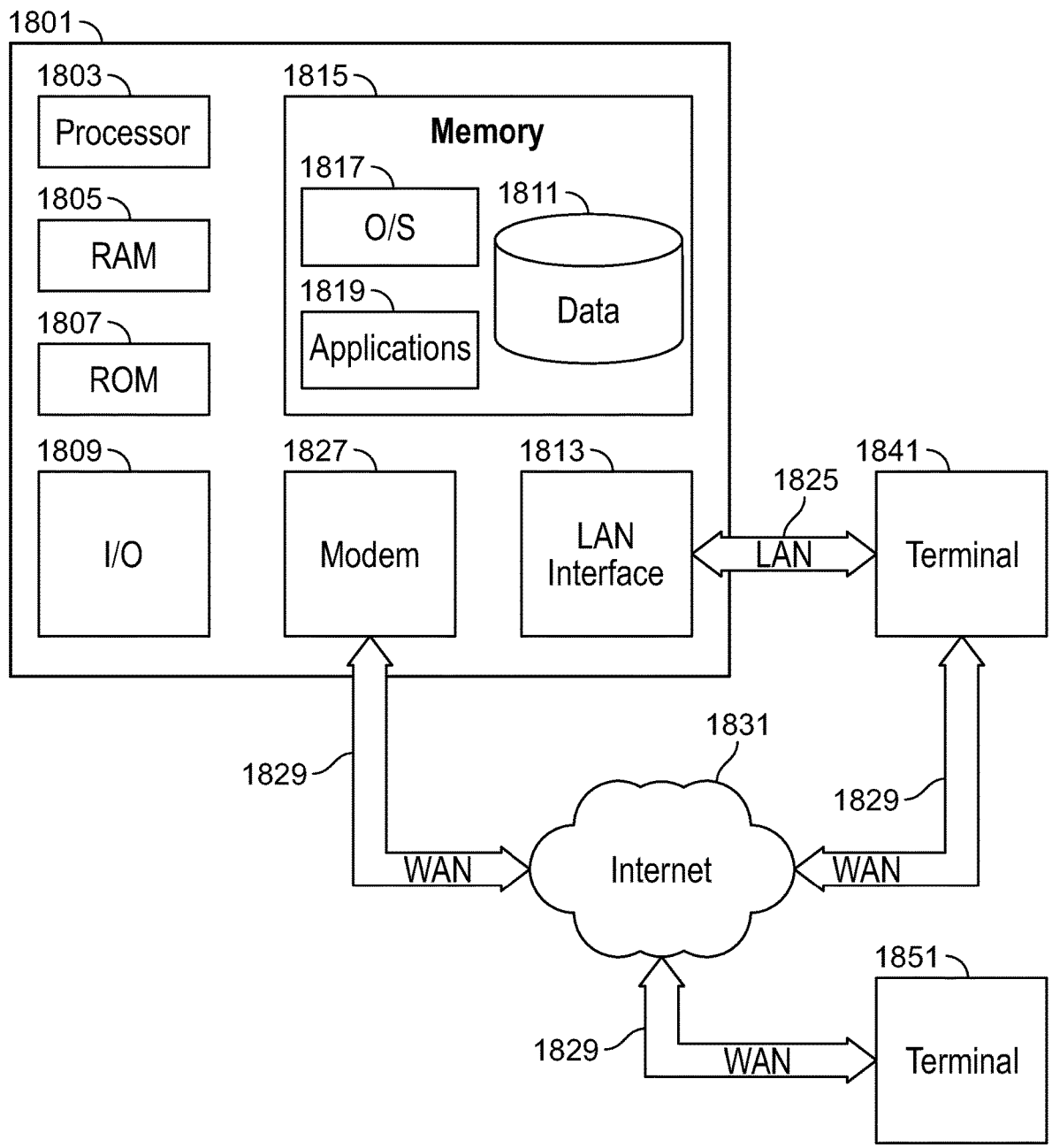
FIG. 18 shows illustrative apparatus that may be used in accordance with principles of the invention.

FIG. 18 is a block diagram that illustrates a computing device 1801 (alternatively referred to herein as a "server or computer") that may be used in accordance with the principles of the invention. The computer server 1801 may have a processor 1803 for controlling overall operation of the server and its associated components, including RAM 1805, ROM 1807, input/output ("I/O") module 1809, and memory 1815.

I/O module 1809 may include a microphone, keypad, touchscreen and/or stylus through which a user of device 1801 may provide input, and may also include one or more of a speaker for providing audio output and a video display device for providing textual, audiovisual and/or graphical output. Software may be stored within memory 1815 and/or other storage (not shown) to provide instructions to processor 1803 for enabling server 1801 to perform various functions. For example, memory 1815 may store software used by server 1801, such as an operating system 1817, application programs 1819, and an associated database 1811. Alternatively, some or all of computer executable instructions of server 1801 may be embodied in hardware or firmware (not shown).

Server 1801 may operate in a networked environment supporting connections to one or more remote computers, such as terminals 1841 and 1851. Terminals 1841 and 1851 may be personal computers or servers that include many or all of the elements described above relative to server 1801. The network connections depicted in FIG. 187 include a local area network (LAN) 1825 and a wide area network (WAN) 1829, but may also include other networks.

When used in a LAN networking environment, computer 1801 is connected to LAN 1825 through a network interface or adapter 1813.

When used in a WAN networking environment, server 1801 may include a modem 1827 or other means for establishing communications over WAN 1829, such as Internet 1831.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 1819, which may be used by server 1801, may include computer executable instructions for invoking user functionality related to communication, such as email, short message service (SMS), and voice input and speech recognition applications.

Computing device 1801 and/or terminals 1841 or 1851 may also be mobile terminals including various other components, such as a battery, speaker, and antennas (not shown). Terminal 1851 and/or terminal 1841 may be portable devices such as a laptop, tablet, smartphone or any other suitable device for receiving, storing, transmitting and/or displaying relevant information.

Any information described above in connection with database 1811, and any other suitable information, may be stored in memory 1815. One or more of applications 1819 may include one or more algorithms that may be used to plot resources, transportation hubs and destinations, calculate distances between resources, transportation hubs and destinations, cluster resources, map or remap clusters to destinations, calculate shadow costs, assign resources to destinations, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 19:
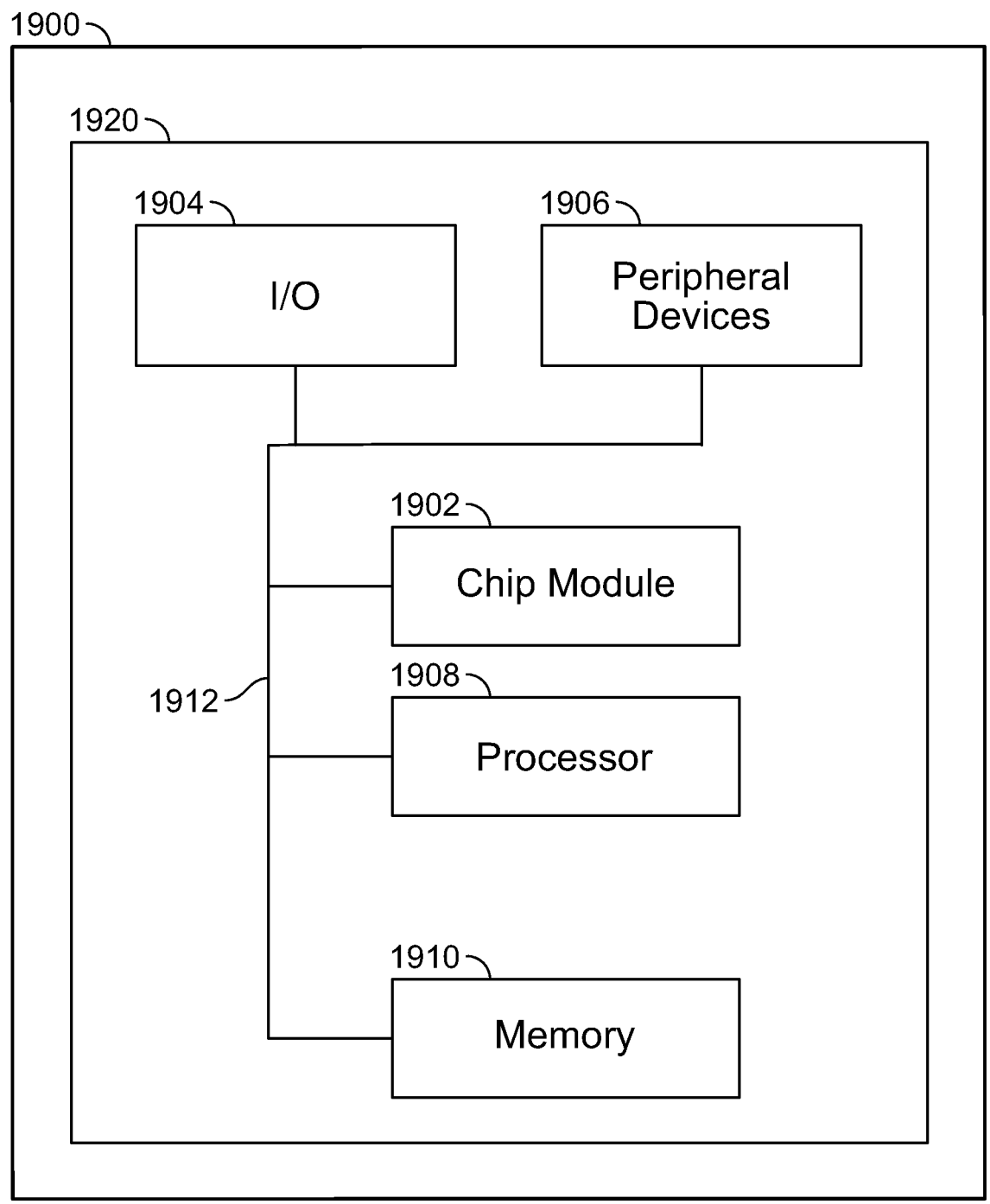
FIG. 19 shows illustrative apparatus that may be used in accordance with principles of the invention.

FIG. 19 shows an illustrative apparatus 1900 that may be configured in accordance with the principles of the invention.

Apparatus 1900 may be a computing machine. Apparatus 1900 may include one or more features of the apparatus shown in FIG. 18.

Apparatus 1900 may include chip module 1902, which may include one or more integrated circuits, and which may include logic configured to perform any other suitable logical operations.

Apparatus 1900 may include one or more of the following components: I/O circuitry 1904, which may include a transmitter device and a receiver device and may interface with fiber optic cable, coaxial cable, telephone lines, wireless devices, PHY layer hardware, a keypad/display control device or any other suitable encoded media or devices; peripheral devices 1906, which may include counter timers, real-time timers, power-on reset generators or any other suitable peripheral devices; logical processing device 1908, which may compute costs, define clusters, and perform other methods described herein; and machine-readable memory 1910.

Machine-readable memory 1910 may be configured to store in machine-readable data structures: resource coordinates, transportation hub coordinates and destination coordinates, distances between resources, transportation hubs and destinations, cluster membership information, shadow costs, resource assignments, scenarios and any other suitable information or data structures.

Components 1902, 1904, 1906, 1908 and 1910 may be coupled together by a system bus or other interconnections 1912 and may be present on one or more circuit boards such as 1920. In some embodiments, the components may be integrated into a single chip.

The chip may be silicon-based.

Figure 20:
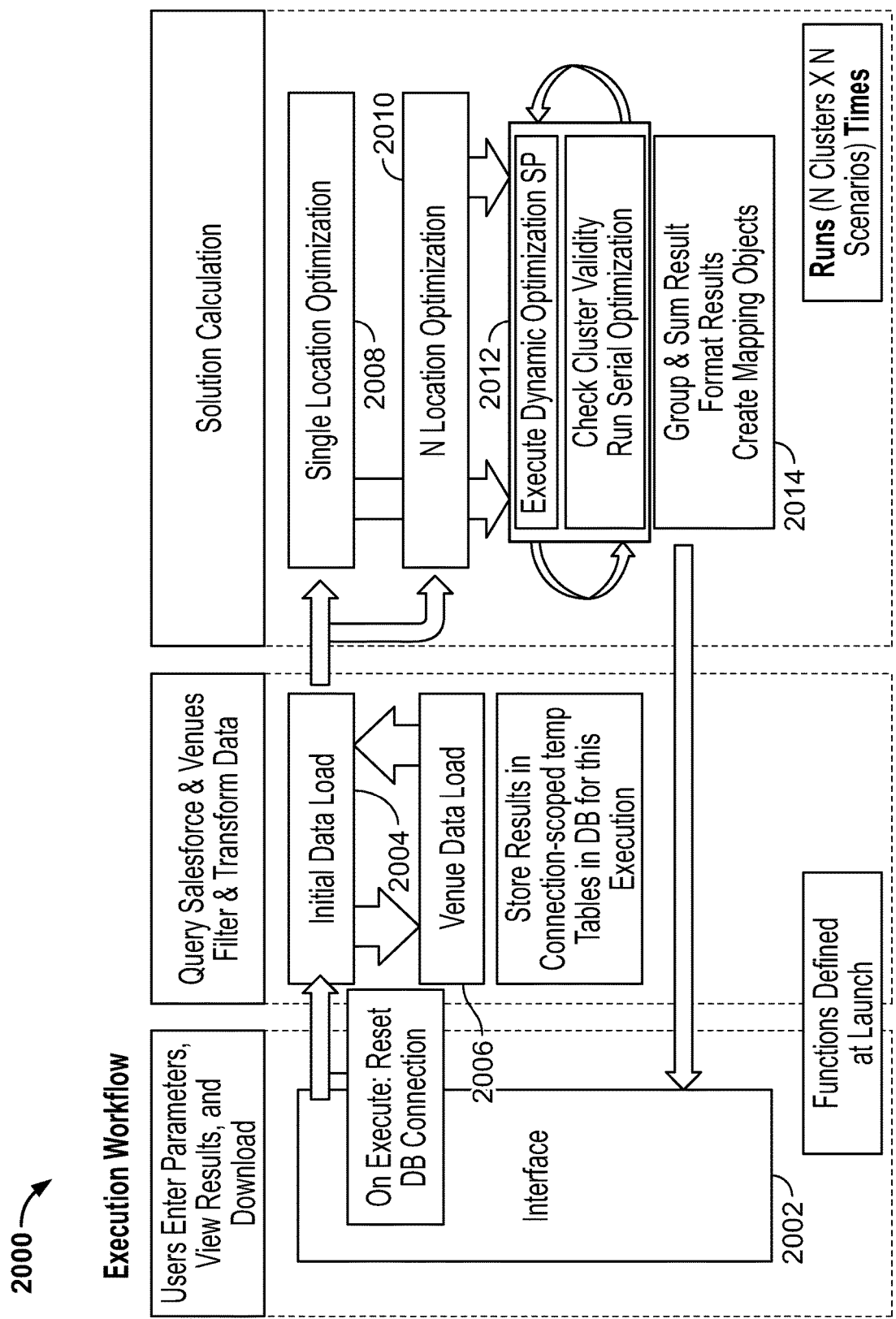
FIG. 20 shows illustrative process steps in accordance with principles of the invention.

FIG. 20 depicts a block diagram 2000 of an execution workflow for the systems and methods described herein. At user interface 2002 users may enter parameters, view results, and download results. Interface 2002 outputs to initial data load 2004. Initial data load 2004 connects to destination data load 2006. Initial data load 2004 outputs to single location optimization 2008 and/or I location optimization 2010. "N" may correspond to Ju. Single location optimization 2008 and I location optimization 2010 are input to optimization system 2012. Optimization system 2012 executes dynamic optimization SP and checks cluster validity and runs serial optimization iteratively. Results are grouped and summed 2014. The results are formatted and mapping objects are created. The formatted results and mapping objects may then be sent to user interface 2002.

Through the user interface 2002, users may, for example, input the following information about an event: start date, number of days in event, number of nights in event, therapeutic area (for a conference), total attendee number, number of destinations, number of results to return, rolls of the attendees, business units, and how many attendees are from central locations. User interface 2002 may also be used to display results to a user.

At initial data load 2004, the system applies logic created by the user through the interface and queries database tables. The system loads destination data by querying a database containing destination information and applying logic from user input about countries and speculative destinations. The results are saved to a connection-scoped temporary table in a system database. Updates are applied to the temporary table. The system acquires the price closest to the dates selected for each destination from a Price Cache table in a database. The system notes the rate type of the cost to mark the pricing update successful. At initial data load 2004, a K-means clustering algorithm is run on the latitude-longitude coordinates of attendee locations utilizing Haversine distance calculations. The clustering algorithm adds in any attendees sent "artificially" from the headquarters locations. Geography data for each cluster (meeting location) is written to a database, which may then be read by stored procedures when determining a solution.

At single location optimization 2008, the system executes the stored procedure Cluster Optimization, which joins together partial solution paths that have been pre-calculated in a database and applies the logic received in this execution. The Cluster Optimization procedure takes parameters and a solution universe that has been restricted by user input and other logic in the application. It applies logic about which attendees should drive or fly. Cluster Optimization routes each attendee in a given cluster to every destination, calculating each cost of each step of the journey and returns disaggregated results. After Cluster Optimization is executed, all costs of travel and attendance for each eligible attendee to a destination are summed 2014, resulting in an overall event cost at each destination that is returned to the user at interface 2002.

At I location optimization 2010, the stored procedure Cluster Optimization is executed for every cluster (meeting location). After optimal results are found within each cluster, checks are performed to see if any individual assigned to one cluster could attend at the destination selected for the other cluster more cheaply than his own. After checks are performed, a globally optimal solution is aggregated (the same format and cost breakdown as a single optimization) and recorded. The best destination (as determined by the total cost of attendance/number of attendees) is dropped from the possible solution set. This process is repeated until either the number of solutions requested is reached or the destination list is exhausted.

I location optimization 2010 allows users to request a single location or multiple locations as the solution. Such a request option makes destinations that could not contain all travelers potential event destinations. Because this increases the solution space, an (I+20) destination solution is at least as good as any (I) destination solution. This is an inversion of the Le Chatlier Principle: removing constraints from the problem may only make the solution the same or better. In the case of the multi-destination optimization, the systems and methods described herein may provide a global optimal destination assignment under the conditions laid out.

After an initially optimizing the geographically-clustered groups in the same manner as a single-location optimization, I locations have been chosen for J clusters of travelers. The clustering algorithm converges at a point when each set travelers cannot, as a group, become more densely clustered, as measured by the Haversine distance between the latitude-longitude coordinates associated with travelers' territories. Travelers are assigned to territories based on zip code. A latitude-longitude coordinate will only be associated with one territory.

After the initial optimization, it may be the case that another cluster's destination is best for a territory that lies within another cluster because the clustering algorithm does not utilize actual logistics costs in order to save computation time. As a consequence of the initial optimization routine, the destinations—as a set—may accommodate all attendees. Also, this initial result set does not constrain two groups of territories from going to the same destination, so long as the combined groups meet the destinations constraints. The shadow values (as defined below, which may also be referred to herein as "shadow costs") are calculated and used to optimally assign each territory to a destination.

In general, if a destination is least costly for traveler going from jth territory to the kth destination in a set of n, one of the following must be the case for any locally-optimal destination-territory pair:

Absolute advantage of logistics and destination costs
$(L_{j,k})<(L_{j,k+n})$, $(V_k)<(V_{k+n})$ $\forall n \neq 0$
Comparative advantage of logistics overwhelms suboptimal destination cost
$[(L_{j,k+n})-(L_{j,k})]>[(V_{k+n})-(V_k)]$ $\forall n \neq 0$
Comparative advantage of destination cost overwhelms suboptimal logistics cost
$[(L_{j,k+n})-(L_{j,k})]<[(V_{k+n})-(V_k)]$ $\forall n \neq 0$ By virtue of the strong inequalities above, creating n lists wherein each territory is ordered by its cost of attending a destination (detailed below), it will not be possible for any territory to be excluded when the lists are truncated at the point where the destination's capacity is exceeded.

Figure 21:
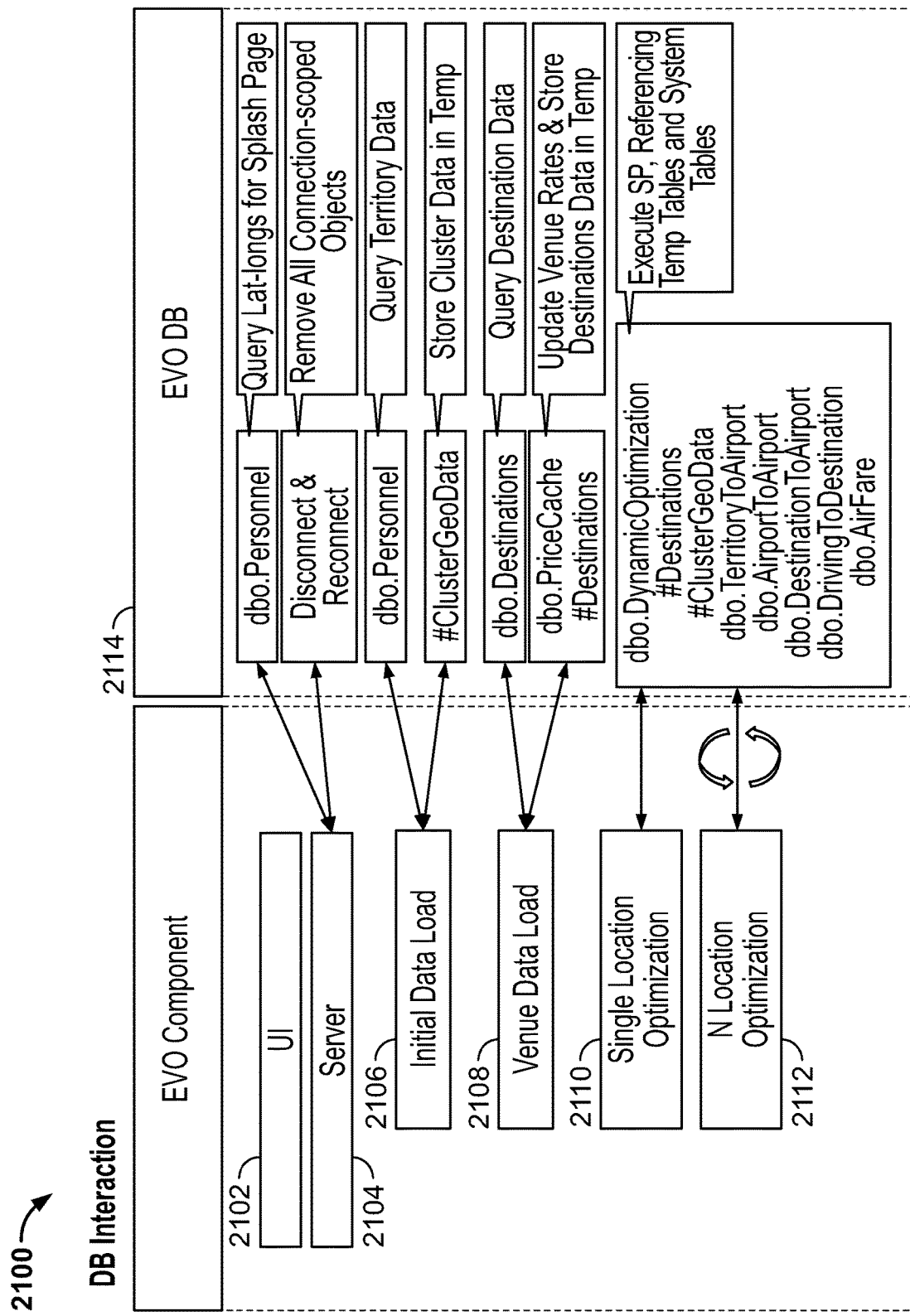
FIG. 21 shows an illustrative system architecture in accordance with principles of the invention.

FIG. 21 depicts a block diagram 2100 showing database interaction. System components include user interface 2102, server 2104, initial data load 2106, destination data load 2108, single location optimization 2110, I location optimization 2112, and database 2114. Database 2114 may contain, for example, transportation data, personnel data, destination data, application data, and application stored procedures data.

Figure 22:
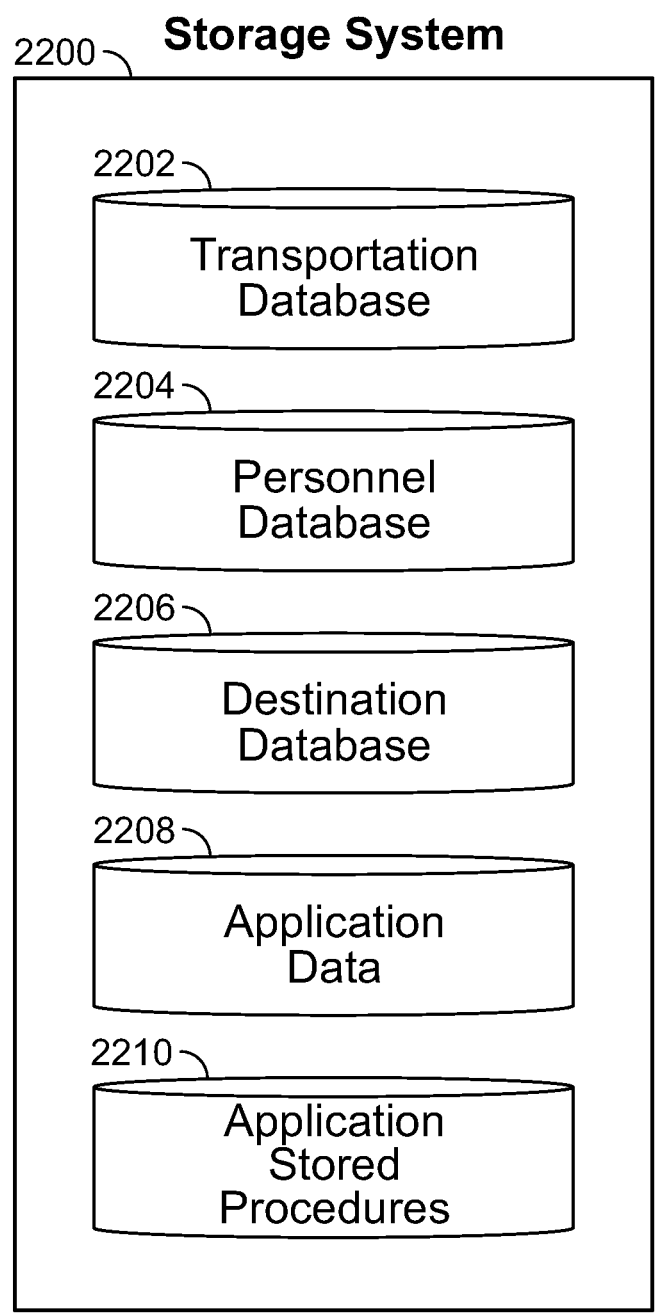
FIG. 22 shows an illustrative information storage architecture in accordance with principles of the invention.

FIG. 22 depicts a system 2200 containing transportation database 2202, personnel database 2204, destination database 2206, application database 2208, and application stored procedures database 2210.

Transportation database 2202 may include data about air travel, including base tables, live tables, and stored procedures. Base tables may be used to update live tables. For air travel, base tables include tables containing flight costs, US region reference, and province geography. A flight cost table may include historical travel expense data, travel dates, departure and arrival airport codes, departure and arrival airport latitude and longitude coordinates, SQL server geography information, and expense of flights. A US region references table may relate US states to regions. A province geography table may be connected to a geography database and contain SQL server geography polygons that represent every shape of every province in the US, Canada, Brazil, and Australia. The province geography table may store a country, province, shape number, and geography polygon for each table entry.

The transportation base tables described above may be used to update live tables including an airfare table and an airport table. An airfare table may relate every US Region (from the US region reference table) and Canadian Province to a cost per mile. The airports table may relate every airport to its airport code and either a US region or Canadian Province. The airports table may comprise latitude and longitude coordinates and SQL server geography data.

Stored procedures in transportation database 2202 may include procedure Air Data Refresh. Air Data Refresh takes a single dataset of all distinct arrival and departure airports and their geography information. It associates airports with countries by performing a geography intersection between the airport geography points and the province geography table from a geography database (GeographyDB). Using the established country-airport relationship to greatly narrow down the Cartesian Product (Cross Join) between the airports and the province shapes, it performs a spatial calculation that approximates the geodesic distance (on the surface of the Earth as defined by the WGS84 coordinate system calculated with SRID 4326 units) between the closest edge of every province polygon to every airport. It assigns the closest country and polygon to each airport. Using the US region reference table to associate regions with provinces, the procedure calculates average costs per mile using the data from the flight costs table for each month between each region. Each region is allowed to be both Departure and Arrival to facilitate these costs being different. The procedure then truncates and rewrites the airfare and airports tables with the calculated information.

Personnel database 2204 may include base tables, live tables, and stored procedures as well. Base tables may be used to update live tables.

Personnel database base tables include a personnel update table. The personnel update table is created when a new salesforce is being uploaded or a salesforce is being created. It contains home addresses, zip codes, business unit, role, and business designations and a personal unique identifier for each member of the salesforce.

Personnel database live tables may include a personnel table. The personnel table contains territory-level information. Territory-level information may be, for example, counts of employees grouped by business, business unit, role, and geography information in territory; business; business unit; roles; latitude and longitude coordinates and SQL server geography; and zip codes.

Personnel database stored procedures may include the stored procedure Personnel Data Refresh. Personnel Data Refresh may clean up column names from base table and truncate and rewrite the personnel table after having related usable geography data to personnel. Cleaning up column names from base table may include relating geography data from a zip codes database within database Geography DB to Personnel Update. Using the zip codes database, the procedure attempts to relate geography information to Personnel Update records by joining on zip codes and states. For personnel who could not be related to geography information with the step above, the procedure attempts to relate geography information to PersonnelUpdate records by joining on city and state.

Destination database 2206 may include application tables such as a destinations table.

The destinations table may be updated regularly using application programming interfaces (APIs) from destination offer marketers. Updates may be provided from metadata including information about the destination's city, province, country, hotel star rating, guest rooms, meeting rooms, and meeting space square footage. The destination data may be combined with historical events data formatted manually to discern costs. All costs are averaged over the events held at each destination.

If a destination lacks costs in fields that are generally not blank or captured elsewhere, first a update process attempts to fill the blanks with average costs for the city the destination is located in and the hotel star rating the destination has. If the city and hotel star rating cannot be matched to calculate the averages, the update process falls back to updating with averages based only on hotel star rating.

Application database 2208 contains general tables that may be accessed by multiple procedures. Application database tables include Personnel To Airport, Airport To Airport, Destination To Airport, and Driving To Destination. Personnel To Airport may contain identifiers linking each territory to its closest airport and the distance from each territory to its airport.

Airport To Airport. Contains identifiers linking each airport to every other airport and the distance. Destination To Airport contains identifiers linking each destination to its closest airport and the distance from each destination to its airport. Driving To Destination contains identifiers linking territories to destinations that they should drive to rather than fly. This table may be based on a parameter that indicates the maximum allowable driving distance.

Application stored procedures may include an intermediate refresh procedure and a cluster optimization procedure. Using the destinations, airports, and personnel tables described above, the intermediate refresh procedure may rewrite tables in the application database by performing approximate geodesic distance calculations (on the surface of the Earth as defined by the WGS84 coordinate system calculated with SRID 4326 units).

The cluster optimization procedure may be executed during an optimization run for each cluster of territories, wherein the number of executions is equal to the number of destinations multiplied by the number of scenarios, being optimized. This procedure utilizes connection-scoped temporary tables to select the territories associated with each cluster. It further uses a temporary destinations table that has been modified to reflect the prices for the dates selected by the user. Using the application database, the route from every territory to every destination using the shortest possible route is found, associating a distance with each leg of travel. After distances associated with each leg of travel are established, calculations are applied on a territory-by-territory basis. These calculations may include, for example:

Salary costs calculated using speed assumptions, such as:
60 mph for driving legs
385 mph for air (Average cruising speed of Boeing 737)
Salary cost per minute given to stored procedure as a parameter
Territory Flight Salary Cost=Distance In Flight*(Salary/(385/60.0))*2.0*Representative Count
Territory Driving Salary Cost=Distance Driving*Salary Salary and travel costs doubled to reflect travel to and from destination $0.55/mile used to establish driving costs Food and destination costs calculated got the number of event days and the number of travelers in the territory Accommodation fees calculated using room rates, the number of travelers from a territory, and the number of nights of the event Room rates are scaled based on historical performance of event managers, as this is determined to be a function of peculiarities at destinations (e.g. a destination with a large footprint may require more guides to facilitate movement around the facility). If in the past a destination has required many external personnel to be sent along, thereby increasing overall accommodation expenditures, these deviations are calculated and turned into a multiplier that is then used to scale up quoted event rates from marketer application programming interface (API). Marketers APIs display several rates. The systems and methods described herein use the average rate, which does not include any additional fees generally charged to transient travelers. This is representative of the increased leverage of a pooled (grouped) booking.

Figure 23:
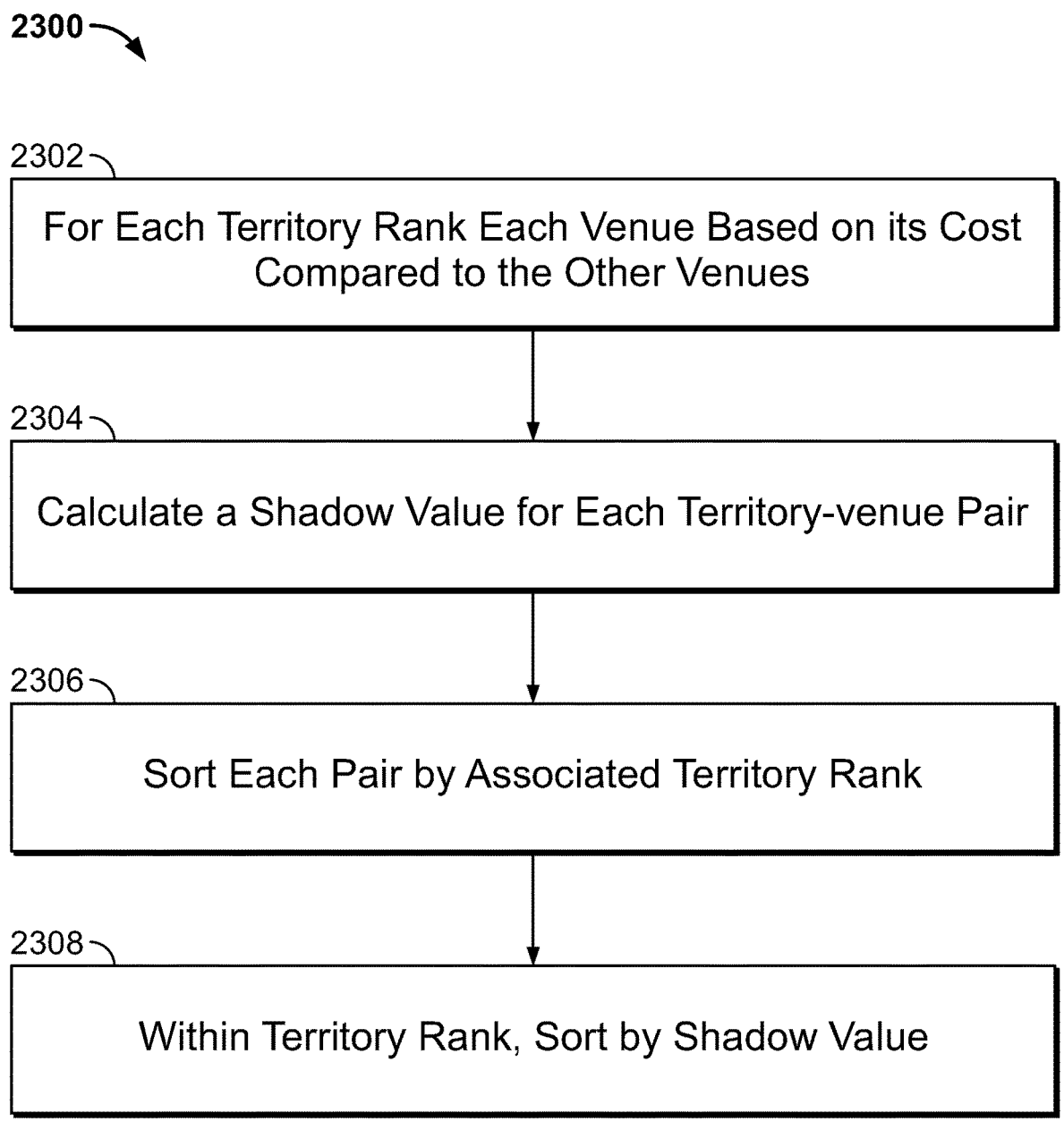
FIG. 23 shows illustrative process steps in accordance with principles of the invention.

FIG. 23 depicts a flowchart 2300 for determining an ordered list of destination prices by territory. At step 2302, for each territory, associate each destination with a rank, wherein the rank is based on the destination cost compared to other destinations. The least costly destination is given a rank of 1, the second least costly is given a rank of 2, and so forth. Rank $N_\tau$ is given to the costliest destination of $\eta$ destinations associated with a territory. At step 2304, calculate a shadow value for each territory-destination tuple. The shadow value is defined as the cost of foregoing the destination indicated in the tuple for the next costlier option.

For the first $\eta-1$ ranks, each tuple is sorted first by rank ascending at step 2306, then, within ranks, by shadow value descending at step 2308. Thus the position of each territory within each destination is determined by how much it would cost the overall optimization to send the territory to its next most optimal location.

For the final rank $\eta$ each tuple is sorted first by rank ascending at step 2306, then, within ranks, by the negated shadow value associated with the destination ranked $\eta-1$ at step 2308. This ensures that the territories easiest to "send" to their lowest-ranked position will be prioritized.

The rankings are used in a master list. The master list removes results where the sums of attendees exceed the capacities of the destinations. Because the sum of the destinations' capacities may be greater than the total number of travelers, the result may contain multiple instances of territories because the additional capacity made possible the inclusion of a territory in suboptimal locations.

Territories are then removed from destinations where the rank of the territory-destination tuple is not the lowest rank that remains for that territory. Ties in ranks are theoretically possible, and are resolved by an arbitrary process that results in a single instance of each rank for each destination for each territory.

A pathological case exists wherein the truncation of each destination at its capacity excludes territories from their optimal destinations because the inequalities above do not hold for the tying ranks. This is avoided by assigning all ties their lowest preference value as a rank. For example, in the set {1,2,3,3,23,5}, our ranks would be {1,2,23,23,5,6}. This ensures all territories that are unambiguously cheaper to send to a destination are assigned a higher preference. However, in cases where ties are generated and excess capacity exists, it is possible to leave a single territory in the result set multiple times. This is resolved by testing for duplicate territory identifications and removing them. The result of this process will be a global optimal solution at the territory level.

FIGS. 24-30 show views of information that may be displayed to a user by the systems and methods.

Figure 24:
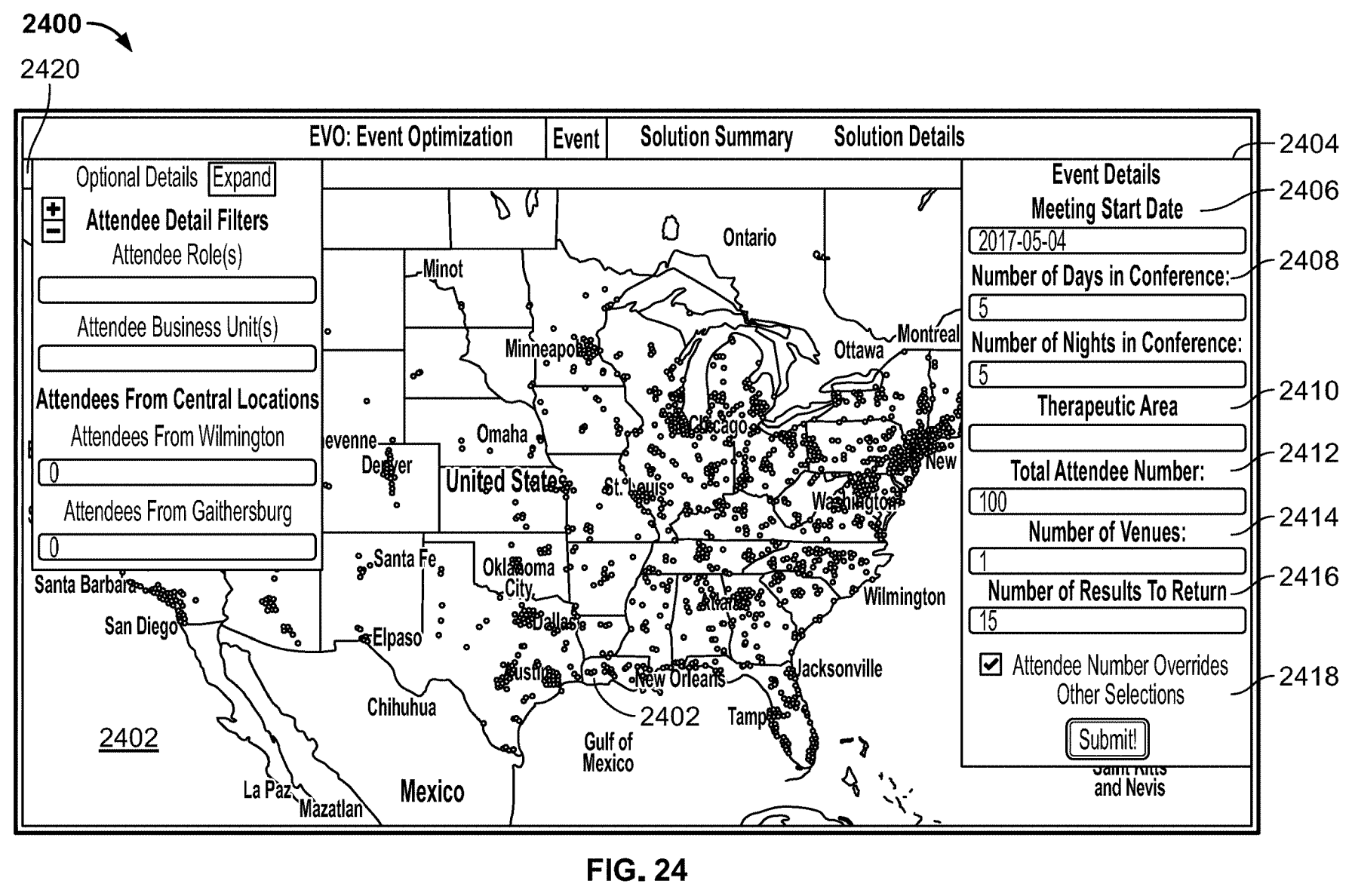

FIG. 24 shows illustrative view 2400 of information that a user may use to cause the system to assign resources to destinations. The system may refer to resources as "attendees." the system may refer to destinations as "venues." Map 2402 may show a geographic area and the areas geographic features, such as states. A grid (not shown) may be used to map resources onto map 2402. The system may provide input feature 2404. The user may provide input data such as meeting start date 2406 for an event during which numerous resources will attend numerous destinations. The user may provide number of days in conference, which may indicate the duration of the event. The user may provide therapeutic area 2410, which may correspond to a field of endeavor or a theme of the event. The user may provide total attendee number 2412, which may indicate the total number of resources that are to be assigned to the destinations. The user may provide number of venues 2414, which may correspond to the number of destinations to be considered by the system for assignment of the resources. The user may provide number of results to return 2416, which may correspond to a number of destinations among which to distribute the resources. The user may indicate in control 2418 that attendee number overrides other selections. Control 2418 may be activated (as shown) to force the system to assign all of the attendees to destinations.

The system may provide display filter 2420. The user may use filter 2420 to cause the system to show in view 2400 only selected attendee roles (e.g., organizational chart titles, departments or roles at the event, such as presenter, chairman, etc.), attendee business units, or only attendees from selected locations.

Figure 25:
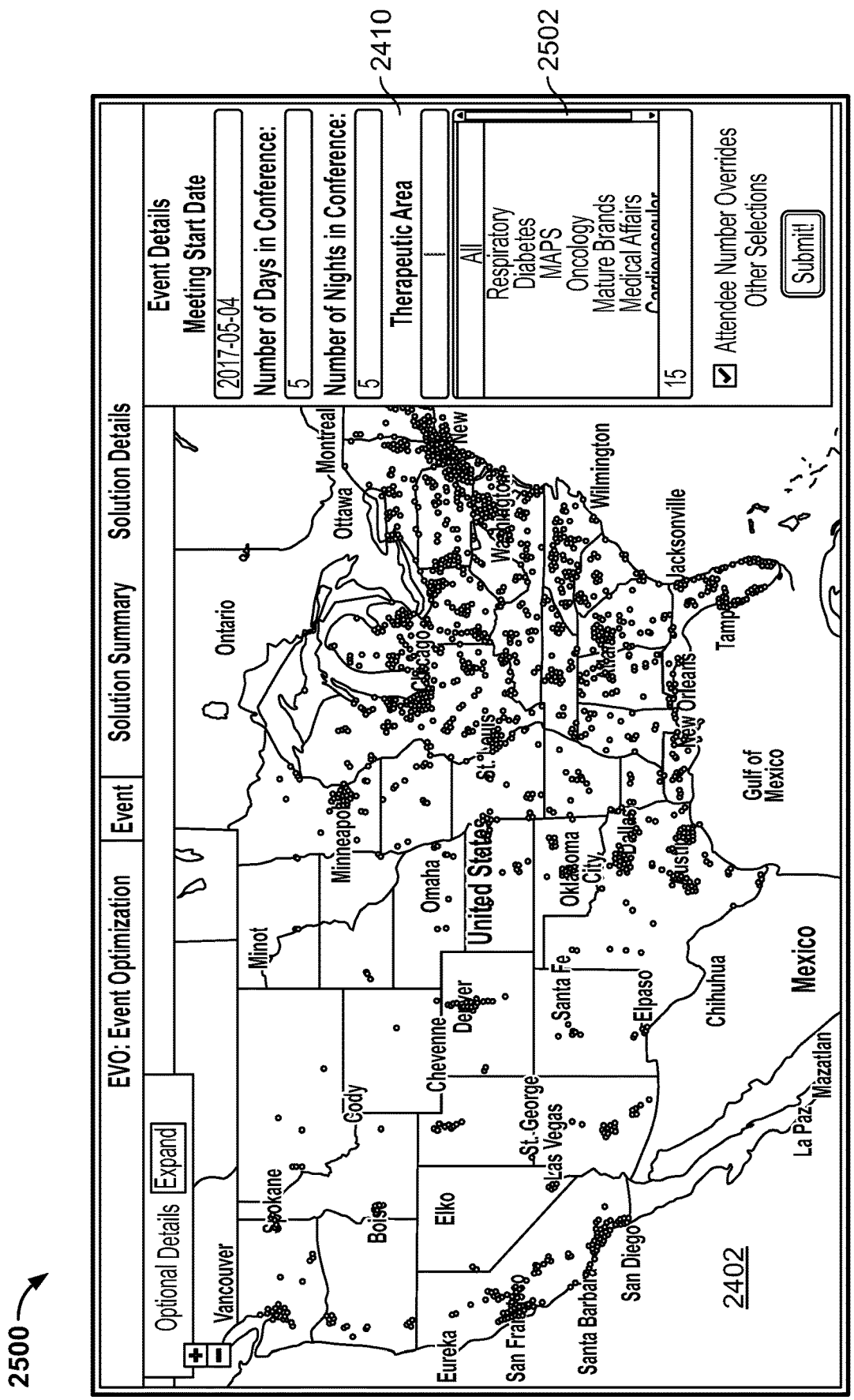
FIG. 25 shows illustrative information in accordance with principles of the invention.

FIG. 25 shows illustrative view 2500 of information that a user may use to cause the system to assign resources to destinations. View 2500 includes drop-down list 2502 of therapeutic areas 2410

Figure 26:
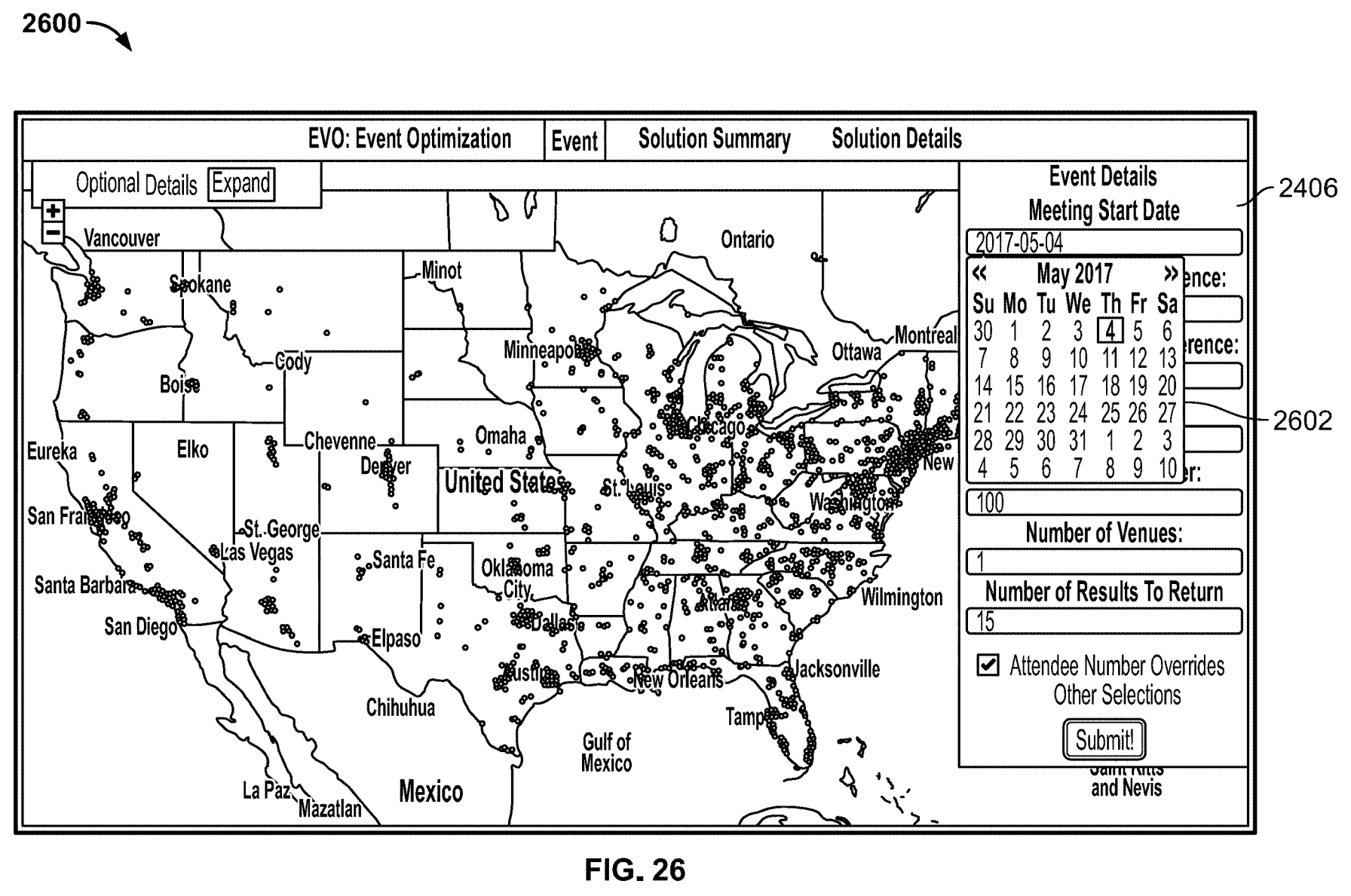

FIG. 26 shows illustrative view 2600 of information that a user may use to cause the system to assign resources to destinations. View 2600 includes drop-down calendar 2602 of meeting start date 2406.

Figure 27:
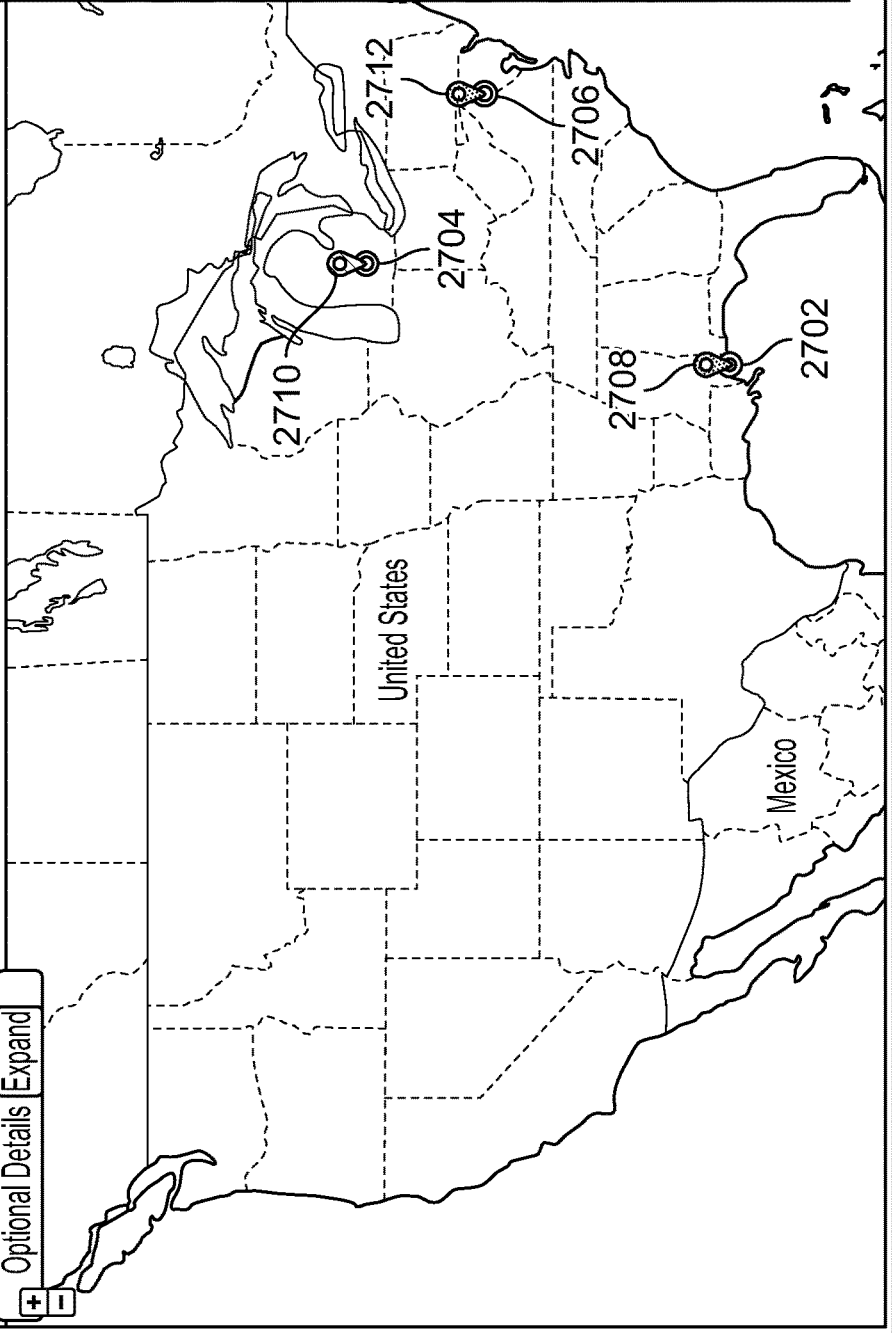
FIG. 27 shows illustrative information in accordance with principles of the invention.

FIG. 27 shows illustrative view 2700 of information including halos 2702, 2704 and 2706 encircling destinations 2708, 2710 and 2712, respectively. The size of a halo represents the relative cumulative shadow cost that would be incurred by removing the corresponding destination from the solution set. View 2700 corresponds to a two-destination solution, in which the user selected three scenarios ("results"). View 2700 indicates that, given the group of individuals selected, it is most cost-effective to conduct the event in one venue for each scenario (hence, three solutions are shown).

Figure 28:
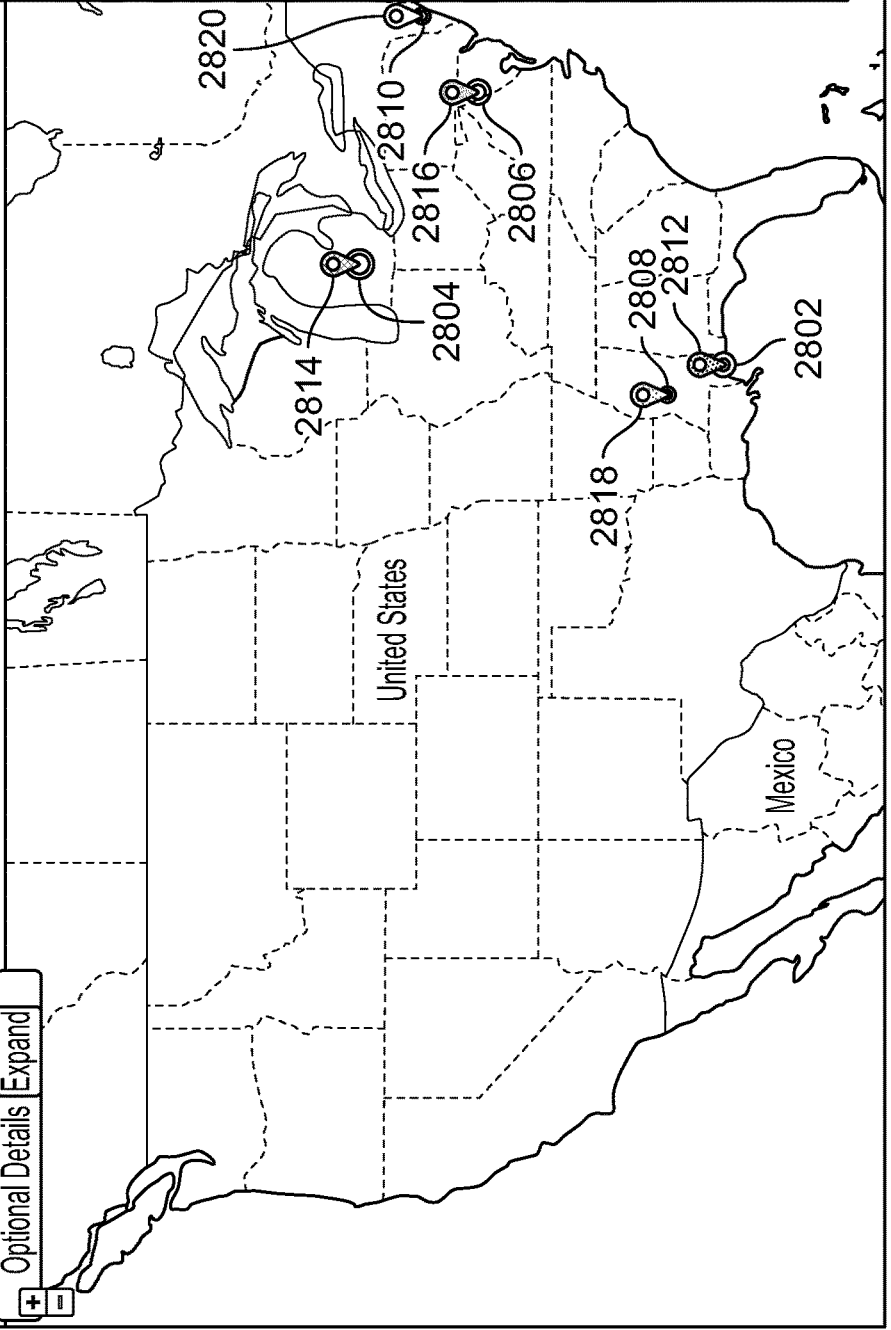
FIG. 28 shows illustrative information in accordance with principles of the invention.

FIG. 28 shows illustrative view 2800 of information including halos 2802, 2804, 2806, 2808 and 2810 encircling destinations 2812, 2814, 2816, 2818 and 2820, respectively. The size of a halo represents the relative cumulative shadow cost that would be incurred by removing the corresponding destination from the solution set. View 2800 corresponds to a one-destination solution. Only the five least costly scenarios ("results") are shown.

FIGS. 29 and 30 show illustrative summary views 2900 and 3000, respectively, of costs calculated, given the set of individuals selected and other metadata for each destination in a one-destination solution.

Listing 1 includes illustrative pseudocode elements that illustrate algorithmic elements for performing one or more of the process steps discussed herein.

Listing 1. Illustrative pseudocode elements.

```
Query Pre-Processed Data From Server {Input resource, destination and sales
territory identifiers.}
Personnel = Query( )
Destinations = Query( )
SalesTerritories = Query( )
Retrieve Inputs From User
Specify Attendee Groups According To Business Unit And Employee Role
    BusinessSelection = fromInput( )
    UnitSelection = fromInput( ) # Filter possible input based on business selection
    RoleSelection = fromInput( ) # Filter possible input based on business selection and
unit selection
Specify Meeting Parameters
    MeetingDays = fromInput( )
    MeetingNights = fromInput( )
    AttendeeNumber = fromInput( ) # If a full business unit is not attending, specify size
of subset. The full group will be (seeded) randomly sampled without replacement
{AttendeeNumber may correspond to Number of resources.}
    MeetingLocations = fromInput( ) # Number of meeting locations (User can bind
results with this input)
    DateOfMeeting = fromInput( ) # Enter start date of event
    NumberOfScenarios = fromInput( ) # Enter the desired number of scenarios for
sensitivity analysis
    AllowOversample = fromInput( T/F ) # Allow modelling of more travelers than
actually exist in territory selection
```

Listing 1. Illustrative pseudocode elements.

```
Augmented Inputs
For a list of headquarters/central locations, specify the number of attendees and the grid
identifier (locale, e.g. Zip Code, (Lat,Lon)) of the central location
     Location1 = CreateCentralLocation(GridIdentifier, fromInput( ))
     Location2 = CreateCentralLocation(GridIdentifier, fromInput( ))
     Central AttendeeNumber = sum(LocationX.Count)
Prepare Traveler and Destination Data With Given User Inputs
Accommodate no user input
     AdaptiveFilter = function(X) {if is.null(criteria) return(X) else require(X in
criteria)}
     PotentialModeledSalesTerritories = AdaptiveFilter(SalesTerritories, criteria =
Territories IN BusinessSelection)
The number of attendees is typically far lower than the size of the sales territories
selected
Because of this, it is necessary to take a stratified sample of the eligible attendee
population
to ensure the blend of Roles, Business Units, and Territories is representative of the
larger population
     ModeledSalesTerritories =
RepresentativeSample(PotentialModeledSalesTerritories)
Apply Oversampling
     ModeledSalesTerritories = if is.true(AllowOversample)
Oversample(ModeledSalesTerritories) else ModeledSalesTerritories
Query Smoothed Accommodation & Venue Rates By Destination Based on User's
Event Month Selection & Calculated Seasonality
     Destinations <- update(Destinations, Rate = DynamicQuery( ))
     if(MeetingLocations == 1){
During preprocessing, a server is populated with tables mapping all possible travelers
(gridded territories) with all possible midpoints and final destinations {Travelers may
correspond to "resources." "Gridded" may correspond to being plotted on a geographic
grid. A "territory" may correspond to location or a region.}
Based on proximity, travelers are assigned to drive to some destinations and fly to
others
Preprocessing applies smoothing, seasonality, and extrapolation methods to
accommodation rates, travel durations, travel rates, personnel reimbursement,
and location-specific event costs, including venue rental, event management services,
etc.
All these costs are calculated for every venue given the number of attendees selected by
user, as sampled by the stratified sampling algorithm
Finally, capacity constraints by venue are respected - Sq. Footage in Event Spaces,
Number of rooms, etc.
For ease of computation, as much data as possible is updated on a nightly basis and
queried via an executed stored procedure (SP) during application execution
          SingleSolutionList = SPExecuteQuery(ModeledSalesTerritories,
Destinations, OtherParameters) {A solution may correspond to a mapping of a cluster to a
destination.}
          SingleSolutionList = ApplyVenueConstraints(SingleSolutionList)
Ancillary Measures And Costs - For every traveler, hours spent travelling are estimated
and salaries are applied to estimate "dead space" cost
          SingleSolutionList = TravelerCostUpdate( )
The top solutions are plotted & travelers are highlighted on a (geographic) mapping
interface, and costs are broken down in a table elsewhere in the application
          PlotOutput <<- MapTravelers(ModeledSalesTerritories) +
MapSolutions(SingleSolutionList)
          TableOutput <<- BuildCostBreakDown(ModeledSalesTerritories,
SingleSolutionList)
####### EXIT EXECUTION CYCLE ##################
     }
     if(MeetingLocations > 1){
Cluster Territories Using A Generalized Distance Function From Gridded Territories
To Locations That Is Results In A Roughly Euclidean Surface
Generalized Distance is a function of cost, which is a function of geodesic distance
          ClusteredTerritories =
KMeans(ComputeGeneralDistance(ModeledSalesTerritories, Destinations))
Run the same query above, taking the best possible destination for each cluster,
combining them in an object called ClusterSolutionList
Also, save a version of the query results without aggregating the territory grid
(TravelerSolutionList) data to the cluster level
          for(NumberOfScenarios){
               for(Cluster in ClusteredTerritories){
                    ClusterSolution = SPExecuteQuery(ClusteredTerritories,
Destinations, OtherParameters)
                    TravelerSolutionList[Cluster] = ClusterSolution
                    ClusterSolution = TravelerCostUpdate( )
                    ClusterSolutionList[Cluster] = ClusterSolution
               }
```

| Listing 1. Illustrative pseudocode elements. |
|---|

```
If multiple clusters are assigned to the same venue, run through a routine that:
Checks feasibility, if infeasible, moves cluster to next most optimal solution
(determined by shadow price), {Feasibility may include the ability of destination to
accommodate the resources in the cluster. "Next most optimal" may correspond to "next
most inexpensive."}
And, if a single location remains optimal for multiple clusters, groups them together,
aggregating figures in ClusterSolutionList
            define RepeatVenueHandling = { {Venue may correspond to
"destination. "}
                    # If a destination is repeated in the results,
check to make sure the venue can accommodate both clusters
                    # If it may, continue
                    # If a destination is repeated in the results and
the venue cannot accommodate both clusters, enter block to calculate cluster-level optimal
locations
                    # Aggregate every traveler's costs to go to any
of the repeated destinations
                    # Sum the shadow values of not going to most
optimal locale and take the lowest nonzero aggregate shadow cost
                    # Calculations aggregated to Venue - Cluster
pairs
                    # Update details (costs) for affected clusters
            }
            define SerialOptimization = {
                    # Aggregate costs, attendees, and destination
data and identify the most binding capacity constraint for each venue
                    # Join to traveler cost set to compare the
assigned destination with other optimal destinations for each traveler
                    # For each traveler, rank the cost of attendance
at each venue, 1 being cheapest
                    # Create ShadowValue: Cost of having to go to
next, more expensive venues from current venue
                    # If this venue is the lowest rank, take the
negative of the previous shadow value to ensure travelers that were
                    # cheapest to send to their lowest ranked
destination are listed after all positive shadow values (travelers with options)
                    # but prioritized over other travelers that
ranked a destination last and were more expensive to send there
                    # For each Venue, sort by rank (cost of
attendance for traveler) and shadow value (cost of foregoing a venue for the next less
optimal)
                    # Creates the order of precedence: Who should
be assigned to a venue "first", based on both the rank of the venue for the traveler & the
alternative cost
                    # With precedence established, calculate a
rolling sum of attendees down the rank-ordered record set of all potential travelers (used to
accommodate venue capacity)
                    # Remove those travelers from the bottom of
the preference order & in excess of venue capacity
                    # Remove travelers from the venue(s) that are
not their most preferred (However, they are guaranteed to be left at the best location for
them conditional on the configuration of the traveler set)
                    # Handle possibility of duplicated travelers
(tied ranks & excess capacity)
                    # Re-aggregate Data to cluster level,
considering all traveler costs & cluster reassignments
            }
            if(length(unique(ClusterSolutionList$Destination)) <
MeetingLocations){
                ClusterSolutionList = ReapeatVenueHandling(ClusterSolutionList)
            }
Solve for optimal assignment of every set & subset of travelers given destinations from
initial solution & Re-aggregate Data to cluster level, considering all traveler costs &
cluster reassignments
            if(length(unique(ClusterSolutionList$Destination)) > 1){
                    ClusterSolutionList = SerialOptimization(ClusterSolutionList,
TravelerSolutionList)
            }
Save Cluster Set & Subset Optimals For Scenario Reporting
            SolutionScenarios[NumberOfScenarios] = ClusterSolutionList
        }
The top solutions are plotted & travelers are highlighted according to their optimal
clustering on a (geographic) mapping interface, and costs are broken down in a table
elsewhere in the application
        PlotOutput <<- MapTravelers(ModeledSalesTerritories) +
MapSolutions(SingleSolutionList)
```

-continued

Listing 1. Illustrative pseudocode elements.

```
        TableOutput <<- BuildCostBreakDown(ModeledSalesTerritories,
SingleSolutionList)
    ############ EXIT EXECUTION CYCLE #################
}
```

One of ordinary skill in the art will appreciate that the steps shown and described herein may be performed in other than the recited order and that one or more steps illustrated maybe optional. Apparatus and methods may involve the use of any suitable combination of elements, components, method steps, computer-executable instructions, or computer-readable data structures disclosed herein.

Thus, methods and apparatus for providing machine-based planning have been provided. Persons skilled in the art will appreciate that the present invention may be practiced by other than the described embodiments, which are presented for purposes of illustration rather than of limitation. The present invention is limited only by the claims that follow.

What is claimed is:

1. A method for machine-based dynamic reallocation of a plurality of resources among a plurality of destinations to globally optimize total cost in event planning, the method comprising:
    receiving from a user at an interactive user interface:
        a selection of a plurality of geographically different resources; and
        a specification of a number of destinations;
    using a processor:
    clustering the plurality of geographically different resources into a plurality of clusters of proximate resources, the number of clusters equal to the number of destinations;
    calculating a cost of transporting each resource to each of the destinations and storing the costs in machine-readable memory, referenced by resource and destination;
    mapping each cluster to a respective one of the destinations to determine, based at least in part on the costs of transporting the resources in the cluster to a destination, a total cost of transporting all of the resources in the plurality of clusters to the respective destinations, wherein the mapping of a cluster comprises mapping all of the resources included in the cluster to the same destination;
    reallocating a resource included in a first cluster from a first destination to a second destination, wherein the remaining resources included in the first cluster are mapped to the first destination, the reallocating comprising:
        accessing the mapping comprising the clusters, the resources and the destinations;
        accessing the stored costs for transporting each resource to each destination;
        ranking each resource within the first cluster based on a set of shadow costs, each shadow cost comprising a cost of remapping the resource to a next-more-costly destination, the cost of remapping the resource based at least in part on the stored costs for transporting the resource to each destination;
        determining that a total number of resources in the first cluster exceeds a predetermined capacity of the first destination; and
        based on the ranking, reallocating a resource that exceeds the predetermined capacity from the first destination to the second destination; and
    at a display associated with the interactive user interface:
        displaying the destinations to which clusters are mapped in a pictorial representation; and
        displaying an assignment of all of the resources, including the reallocated resource, to the destinations for planning an event.

2. The method of claim 1 wherein the total cost is a lowest cost of transporting all of the resources in the plurality of clusters to their respective destinations.

3. The method of claim 1 wherein each destination has a predetermined capacity to hold a number of resources and the mapping is constrained to identify a set of destinations, the set having an aggregate capacity greater than or equal to the total number of resources.

4. The method of claim 1 further comprising assigning each resource to one of the destinations based on:
    the mapping; and
    a shadow cost for the resource.

5. The method of claim 1 further comprising assigning to each of the plurality of destinations only resources:
    that are mapped to the destination;
    for which a predetermined capacity of the destination is not exceeded by assignment of the resources; and
    whose assignment to the destination does not exclude from the destination, by filling the predetermined capacity, a different resource that is:
    mapped to the destination; and
    has a shadow cost that is higher than a shadow cost of the resource of the assignment.

6. The method of claim 1 further comprising:
    storing in machine readable memory:
        for a first of the resources a first resource record including, for each of the destinations, a first shadow cost for the first resource; and,
        for a second of the resources a second resource record including, for each of the destinations, a second shadow cost for the second resource;
    using the processor, identifying a destination, of the plurality of destinations, for which the first and second shadow costs are equal; and
    changing the second record so that the second shadow cost is less than the first shadow cost.

7. The method of claim 1 further comprising calculating for each cluster a sum of costs of transporting each resource in the cluster to the one of the destinations to which the cluster is mapped.

8. The method of claim 1 wherein a resource is not constrained to fall within a particular cluster.

9. The method of claim 1 further comprising identifying a destination to which both a first of the clusters and a second of the clusters have been mapped.

10. The method of claim 9 further comprising, when the destination is a first of the destinations, remapping the second of the clusters from the first of the destinations to a second of the destinations only if the first of the destinations has a predetermined capacity that is exceeded by the combined resources of both the first of the clusters and the second of the clusters; wherein the second of the destinations is different from the first of the destinations.

11. The method of claim 10 wherein the remapping includes:
 evaluating for each resource in the second cluster a net cost of remapping the resource to each destination in the plurality of destinations, the net cost comprising an amount by which the cost of remapping the resource exceeds a cost of mapping the resource to the first destination;
 summing, for each destination, the net costs; and
 selecting as the second destination that destination having the lowest net cost.

12. The method of claim 11 further comprising, after the selecting, calculating for each cluster a sum of costs of transporting each resource in the cluster to the one of the destinations to which the cluster is mapped.

13. The method of claim 10 further comprising repeating the identifying and the remapping until all of the clusters are mapped to destinations, the destinations comprising a set of destinations having an aggregate capacity not exceeded by the total number of resources.

14. The method of claim 13 further comprising evaluating for each resource a net cost, for each of the destinations to which the resource is not mapped, of remapping the resource from that destination to which the resource is mapped to that destination to which the resource is not mapped, the net cost comprising the amount by which the cost of remapping the resource exceeds a cost of mapping the resource to the destination to which the resource is mapped.

15. The method of claim 14 further comprising assigning to each of the plurality of destinations only resources:
 that are mapped to the destination;
 for which a predetermined capacity of the destination is not exceeded by assignment of the resource; and
 whose assignment to the destination does not exclude from the destination, by filling the destination, a different resource that is:
  mapped to the destination; and
  has a net cost of remapping that is higher than the resource of the assignment.

16. The method of claim 15 further comprising, before the assigning:
 identifying in machine readable memory:
  a first resource record in which there is a first net cost; and
  a second resource record in which there is a second net cost, the first and second net costs being equal; and
 using the processor, changing the second resource record to lower the second net cost by a predetermined amount so that the second net cost is less than the first net cost.

17. A system for machine-based optimizing of assignment of a plurality of resources among a plurality of destinations in event planning, the system comprising:
 means for receiving from a system user:
  a selection of a plurality of geographically different resources; and
  a specification of a number of destinations;
 means for clustering the plurality of geographically different resources into a plurality of clusters of proximate resources, the number of clusters equal to the number of destinations;
 means for calculating a cost of transporting each resource to each of the plurality of destinations and storing the costs in machine-readable memory, referenced by resource and destination; and
 means for mapping each cluster to a respective one of the destinations to determine a total cost of transporting all of the resources in the plurality of clusters to the respective destinations, wherein mapping the cluster comprises mapping all of the resources in the cluster to the same destination;
 means for reallocating a resource included in a first cluster from a first destination to a second destination, wherein the remaining resources included in the first cluster are mapped to the first destination, the reallocating comprising:
  accessing the mapping comprising the clusters, the resources and the destinations;
  accessing the stored costs for transporting each resource to each destination;
  ranking each resource within the first cluster based on a set of shadow costs, each shadow cost comprising a cost of remapping the resource to a next-more-costly destination, the cost of remapping the resource based at least in part on the stored costs for transporting the resource to each destination;
  determining that a total number of resources in the first cluster exceeds a predetermined capacity of the first destination; and
  based on the ranking, for a resource that exceeds the predetermined capacity, reallocating the resource from the first destination to the second destination; and
 means for displaying to a user:
  a pictorial representation of the mapped destinations; and
  an assignment of all of the resources, including the reallocated resource, to the destinations for an event.

18. The system of claim 17 wherein the total cost is a lowest cost of transporting all of the resources in the plurality of clusters to the respective destinations.

19. The system of claim 17 wherein each destination has a predetermined capacity to hold a number of resources and the mapping is constrained to identify a set of destinations, the set having an aggregate capacity greater than or equal to the total number of resources.

20. The system of claim 17 further comprising means for assigning each resource to one of the destinations based on:
 the mapping; and
 the shadow cost for the resource.

21. The system of claim 17 further comprising means for assigning to each of the plurality of destinations only resources:
 that are mapped to the destination;
 for which a predetermined capacity of the destination is not exceeded by the assignment of the resources; and
 whose assignment to the destination does not exclude from the destination, by filling the capacity, a different resource that is:
  mapped to the destination; and
  has a shadow cost that is higher than a shadow cost of the resource of the assignment.

22. The system of claim 17 further comprising:
means for providing:
- for a first of the resources, a first resource record including, for each of the destinations, a first shadow cost for the first resource; and,
- for a second of the resources, a second resource record including, for each of the destinations, a second shadow cost for the second resource;

means for identifying a destination, of the plurality of destinations, for which the first and second shadow costs are equal; and
means for changing the second resource record so that the second shadow cost is less than the first shadow cost.

23. The system of claim 17 further comprising means for calculating for each cluster a sum of costs of transporting each resource in the cluster to the one of the destinations to which the cluster is mapped.

24. The system of claim 17 wherein a resource is not constrained to fall within a particular cluster.

25. The system of claim 17 further comprising means for identifying a destination to which both a first of the clusters and a second of the clusters have been mapped.

26. The system of claim 25 further comprising means for remapping, when the destination is a first of the destinations, the second of the clusters from the first of the destinations to a second of the destinations if the first of the destinations has a capacity that is exceeded by the combined resources of both the first of the clusters and the second of the clusters; wherein the second of the destinations is different from the first of the destinations.

27. The system of claim 26 wherein the remapping includes:
- evaluating for each resource in the second cluster a net cost of remapping the resource to each destination in the plurality of destinations, the net cost comprising an amount by which the cost of remapping the resource exceeds a cost of mapping the resource to the first destination;
- summing, for each destination, the net costs; and
- selecting as the second destination that destination having the lowest net cost.

28. The system of claim 27 further comprising means for calculating, after the selecting, for each cluster, a sum of costs of transporting each resource in the cluster to the one of the destinations to which the cluster is mapped.

29. The system of claim 26 further comprising means for repeating the identifying and the remapping until all of the clusters are mapped to destinations, the destinations comprising a set of destinations having an aggregate capacity not exceeded by the total number of resources.

30. The system of claim 29 further comprising means for evaluating for each resource a net cost, for each of the destinations to which the resource is not mapped, of remapping the resource from that destination to which the resource is mapped to that destination to which the resource is not mapped, the net cost comprising an amount by which the cost of remapping the resource exceeds a cost of mapping the resource to the destination to which the resource is mapped.

31. The system of claim 30 further comprising means for assigning to each of the plurality of destinations only resources:
- that are mapped to the destination;
- for which a predetermined capacity of the destination is not exceeded by assignment of the resource; and
- whose assignment to the destination does not exclude from the destination, by filling the destination, a different resource that is:
  - mapped to the destination; and
  - has a net cost of remapping that is higher than the resource of the assignment.

32. The system of claim 31 further comprising:
means for identifying, before the assigning:
- a first resource record in which there is a first net cost; and
- a second resource record in which there is a second net cost, the first and second net costs being equal; and means for changing the second resource record to lower the second net cost by a predetermined amount so that the second net cost is less than the first net cost.

* * * * *